United States Patent
Mukherjee et al.

(10) Patent No.: US 10,002,148 B2
(45) Date of Patent: Jun. 19, 2018

(54) MEMORY-AWARE JOINS BASED IN A DATABASE CLUSTER

(71) Applicant: Oracle International Corporation, Redwood Shores, CA (US)

(72) Inventors: Niloy Mukherjee, Belmont, CA (US); Mohamed Zait, San Jose, CA (US); Juan Loaiza, Woodside, CA (US); Vineet Marwah, San Ramon, CA (US); Tirthankar Lahiri, Palo Alto, CA (US); Jiaqi Yan, San Carlos, CA (US); Kartik Kulkarni, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 325 days.

(21) Appl. No.: 14/806,411

(22) Filed: Jul. 22, 2015

(65) Prior Publication Data

US 2016/0026667 A1 Jan. 28, 2016

Related U.S. Application Data

(63) Continuation-in-part of application No. 14/565,906, filed on Dec. 10, 2014, now Pat. No. 9,875,259.
(Continued)

(51) Int. Cl.
*G06F 17/30* (2006.01)
*G06F 3/06* (2006.01)

(52) U.S. Cl.
CPC ...... *G06F 17/30339* (2013.01); *G06F 3/0604* (2013.01); *G06F 3/0644* (2013.01);
(Continued)

(58) Field of Classification Search
CPC ......... G06F 17/30463; G06F 17/30528; G06F 17/30545; G06F 17/30; G06F 17/30339;
(Continued)

(56) References Cited

U.S. PATENT DOCUMENTS 5,692,174 A 11/1997 Bireley
5,742,792 A 4/1998 Yanai et al.
(Continued)

FOREIGN PATENT DOCUMENTS

EP 2 608 070 A1 6/2013
WO WO2007/078444 A1 7/2007

OTHER PUBLICATIONS

Schaffner, et al., "A Hybrid Row-Column OITP Database Architecture for Operational Reporting", dated 2009, 14 pages.
(Continued)

*Primary Examiner* — Anh Ly
(74) *Attorney, Agent, or Firm* — Hickman Palermo Becker Bingham LLP

(57) ABSTRACT

Techniques are described herein for distributing data from one or more partitioned tables across the volatile memories of a cluster. In memory copies of data from partitioned tables are grouped based on the data falling within the same partition criteria. These groups are used for assigning data from corresponding partitions to the same node when distributing data from partitioned tables across the volatile memories of a multi-node cluster. When a query requires a join between rows of partitioned tables, the work for the join query is divided into work granules that correspond to partition-wise join operations. Those partition-wise join operations are assigned to nodes by a query coordinator based on the partition-to-node mapping located in the node of the query coordinator.

22 Claims, 19 Drawing Sheets

Related U.S. Application Data

(60) Provisional application No. 62/027,535, filed on Jul. 22, 2014, provisional application No. 62/027,695, filed on Jul. 22, 2014, provisional application No. 62/027,703, filed on Jul. 22, 2014.

(52) U.S. Cl.
CPC ...... *G06F 3/0679* (2013.01); *G06F 17/30498* (2013.01); *G06F 17/30584* (2013.01)

(58) Field of Classification Search
CPC ......... G06F 17/30498; G06F 17/30584; G06F 3/0604; G06F 3/0644; G06F 3/0679; G06F 9/5083; G06F 17/30569; H04L 67/42; H04L 67/1008
See application file for complete search history.

(56) References Cited

U.S. PATENT DOCUMENTS

| | | | |
|---|---|---|---|
| 5,778,430 A | 7/1998 | Ish et al. | |
| 5,870,759 A | 2/1999 | Bauer et al. | |
| 6,009,432 A | 12/1999 | Tarin | |
| 6,609,131 B1 | 8/2003 | Zait | |
| 6,954,776 B1 | 10/2005 | Cruanes | |
| 7,010,789 B1* | 3/2006 | Kimelman | G06F 9/5066 718/100 |
| 7,149,769 B2 | 12/2006 | Lubbers et al. | |
| 7,188,113 B1* | 3/2007 | Thusoo | G06F 17/30575 707/E17.005 |
| 7,647,329 B1 | 1/2010 | Fischman | |
| 7,849,221 B2* | 12/2010 | Kumar | G06F 9/4868 707/608 |
| 8,433,684 B2 | 4/2013 | Munoz | |
| 8,856,484 B2 | 10/2014 | Ben-Tsion et al. | |
| 9,292,564 B2 | 3/2016 | Kamp et al. | |
| 9,396,202 B1 | 7/2016 | Drobychev | |
| 2002/0194157 A1* | 12/2002 | Zait | G06F 17/2755 707/E17.082 |
| 2003/0229640 A1 | 12/2003 | Carlson | |
| 2004/0098372 A1 | 5/2004 | Bayliss | |
| 2004/0215904 A1* | 10/2004 | Gopisetty | G06F 3/0613 711/153 |
| 2005/0033818 A1 | 2/2005 | Jardin | |
| 2005/0055380 A1 | 3/2005 | Thompson et al. | |
| 2005/0131879 A1 | 6/2005 | Ghosh | |
| 2005/0131893 A1 | 6/2005 | Von Glan | |
| 2005/0187977 A1 | 8/2005 | Frost | |
| 2006/0013078 A1* | 1/2006 | Goodman | G11B 15/68 369/30.01 |
| 2006/0173833 A1 | 8/2006 | Purcell et al. | |
| 2006/0182046 A1* | 8/2006 | Dageville | G06F 9/4436 370/260 |
| 2008/0059492 A1 | 3/2008 | Tarin | |
| 2008/0065591 A1 | 3/2008 | Guzenda | |
| 2008/0235280 A1* | 9/2008 | Schoen | G06F 17/30286 707/E17.044 |
| 2008/0256250 A1 | 10/2008 | Wakefield et al. | |
| 2008/0281784 A1 | 11/2008 | Zane et al. | |
| 2008/0281865 A1 | 11/2008 | Price et al. | |
| 2009/0037495 A1 | 2/2009 | Kumar | |
| 2009/0043910 A1 | 2/2009 | Barsness | |
| 2009/0063516 A1* | 3/2009 | Wang | H04L 41/0893 707/E17.011 |
| 2009/0100089 A1 | 4/2009 | Eadon | |
| 2009/0119247 A1 | 5/2009 | Bellamkonda | |
| 2009/0265306 A1 | 10/2009 | Barsness | |
| 2010/0106711 A1* | 4/2010 | Graefe | G06F 17/30336 707/715 |
| 2010/0235335 A1 | 9/2010 | Heman et al. | |
| 2010/0235347 A1 | 9/2010 | Chaudhuri | |
| 2010/0250549 A1 | 9/2010 | Muller et al. | |
| 2011/0029569 A1 | 2/2011 | Ganesh et al. | |
| 2011/0047144 A1 | 2/2011 | Han | |
| 2011/0099351 A1 | 4/2011 | Condict | |
| 2011/0137890 A1 | 6/2011 | Bestgen | |
| 2011/0138123 A1 | 6/2011 | Aditya et al. | |
| 2011/0196822 A1 | 8/2011 | Zunger | |
| 2011/0196828 A1 | 8/2011 | Drobychev | |
| 2011/0196833 A1 | 8/2011 | Drobychev | |
| 2012/0078951 A1 | 3/2012 | Hsu | |
| 2012/0173515 A1 | 7/2012 | Jeong et al. | |
| 2012/0310916 A1 | 12/2012 | Abadi | |
| 2012/0323971 A1 | 12/2012 | Pasupuleti | |
| 2013/0275364 A1 | 10/2013 | Wang | |
| 2013/0332590 A1 | 12/2013 | Mohaban | |
| 2014/0040218 A1 | 2/2014 | Kimura et al. | |
| 2014/0040237 A1 | 2/2014 | Chen | |
| 2014/0075493 A1 | 3/2014 | Krishnan et al. | |
| 2014/0114952 A1 | 4/2014 | Robinson | |
| 2014/0149357 A1 | 5/2014 | Gupta | |
| 2014/0317159 A1 | 10/2014 | Dhavale | |
| 2014/0337338 A1 | 11/2014 | Shinn | |
| 2014/0372702 A1 | 12/2014 | Subramanyam | |
| 2015/0006846 A1 | 1/2015 | Youngworth | |
| 2015/0067086 A1 | 3/2015 | Adriaens | |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1 | 3/2015 | Kamp et al. | |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0100574 A1 | 4/2015 | Presta | |
| 2015/0142733 A1 | 5/2015 | Shadmon | |
| 2015/0234895 A1* | 8/2015 | Erdogan | G06F 17/30466 707/714 |
| 2015/0261792 A1 | 9/2015 | Attarde | |
| 2015/0339350 A1* | 11/2015 | Baggett | G06F 17/30498 707/714 |
| 2016/0026660 A1 | 1/2016 | Mukherjee et al. | |
| 2016/0026684 A1 | 1/2016 | Mukherjee et al. | |
| 2016/0034486 A1 | 2/2016 | Dageville | |
| 2016/0036905 A1* | 2/2016 | Syed | H04L 67/1008 709/226 |
| 2016/0048572 A1* | 2/2016 | Khandelwal | G06F 17/30592 707/604 |
| 2016/0350375 A1 | 12/2016 | Das et al. | |
| 2017/0031988 A1* | 2/2017 | Sun | G06F 17/30466 707/E17.044 |
| 2017/0242767 A1* | 8/2017 | Wang | G06F 11/2064 707/E17.014 |

OTHER PUBLICATIONS

Ramamurthy, Ravishankar, "A Case for Fractured Mirrors" Proceedings of the 28th VLDB Conference, dated, 2002, 12 pages.

Nirmesh, Malviya, "Recovery Algorithms for In-Memory OLTP Databases", Master of Science Thesis, dated Jul. 1, 2012, 66 pages.

Farber et al., "SAP HANA Database—Data Management for Modern Business Applications", SIGMOD Record, dated Dec. 2011, vol. 40, No. 4, 8 pages.

U.S. Appl. No. 14/565,906, filed Dec. 10, 2014, Final Office Action, dated Aug. 8, 2017.

Mukherjee, U.S. Appl. No. 14/805,949, filed Jul. 22, 2015, Office Action, dated Oct. 4, 2017.

Mukherjee, U.S. Appl. No. 14/565,906, filed Dec. 10, 2014, Notice of Allowance, dated Aug. 28, 2017.

Das, U.S. Appl. No. 14/806,601, filed Jul. 22, 2015, Office Action, dated Nov. 3, 2017.

U.S. Appl. No. 14/337,179, filed 074/21/2014, Notice of Allowance, dated Jul. 29, 2015.

U.S. Appl. No. 14/337,179, filed Jul. 21, 2014, Office Action, dated Dec. 29, 2014.

U.S. Appl. No. 14/337,179, filed Jul. 21, 2014, Interview Summary, dated Jun. 17, 2015.

U.S. Appl. No. 14/337,179, filed Jul. 21, 2014, Final Office Action, dated Apr. 10, 2015.

Mukherjee, U.S. Appl. No. 14/565,906, filed Dec. 10, 2014, Office Action, dated May 31, 2017.

(56) References Cited

OTHER PUBLICATIONS

U.S. Appl. No. 14/337,164, filed Jul. 21, 2014, Notice of Allowance, dated Feb. 22, 2016.
U.S. Appl. No. 14/337,179, filed Jul. 21, 2014, Notice of Allowance, dated Nov. 3, 2015.

* cited by examiner

CHUNK-TO-NODE MAPPING

| CHUNK | START ADDR | END ADDR | HOST NODE |
|---|---|---|---|
| CHUNK 302 | 330 | 336 | NODE 102 |
| CHUNK 304 | 336 | 342 | NODE 112 |
| CHUNK 306 | 342 | 350 | NODE 122 |

FIG. 3B

CHUNK-TO-NODE MAPPING FOR A PARTITIONED TABLE

| SEGMENT | CHUNK | START ADDR | END ADDR | HOST NODE |
|---|---|---|---|---|
| S1 | CHUNK 302 | 330 | 336 | NODE 102 |
| " | CHUNK 304 | 336 | 342 | NODE 102 |
| " | CHUNK 306 | 342 | 350 | NODE 102 |
| S2 | CHUNK 308 | * | * | NODE 112 |
| " | CHUNK 310 | * | * | NODE 112 |
| " | CHUNK 312 | * | * | NODE 112 |
| S3 | CHUNK 314 | * | * | NODE 122 |
| " | CHUNK 316 | * | * | NODE 122 |
| " | CHUNK 318 | * | * | NODE 122 |

FIG. 3C

| MAPPING FOR NODE 102 | MAPPING FOR NODE 112 | MAPPING FOR NODE 122 |
|---|---|---|
| 330, 102, NUMA1, 332, IMCU322 | 330, 102, NUMA1, 332, X | 330, 102, NUMA1, 332, X |
| 334, 102, NUMA1, 336, IMCU322 | 334, 102, NUMA1, 336, X | 334, 102, NUMA1, 336, X |
| 336, 112, NUMA2, 338, X | 336, 112, NUMA2, 338, IMCU324 | 336, 112, NUMA2, 338, X |
| 340, 112, NUMA2, 342, X | 340, 112, NUMA2, 342, IMCU324 | 340, 112, NUMA2, 342, X |
| 342, 122, NUMA3, 346, X | 342, 122, NUMA3, 346, X | 342, 122, NUMA3, 346, IMCU326 |
| 348, 122, NUMA3, 350, X | 348, 122, NUMA3, 350, X | 348, 122, NUMA3, 350, IMCU326 |
| 330, 112, NUMA5, 332, X | 330, 112, NUMA5, 332, IMCU322 | 330, 112, NUMA5, 332, X |
| 334, 112, NUMA5, 336, X | 334, 112, NUMA5, 336, IMCU322 | 334, 112, NUMA5, 336, X |
| 336, 122, NUMA6, 338, X | 336, 122, NUMA6, 338, X | 336, 122, NUMA6, 338, IMCU324 |
| 340, 122, NUMA6, 342, X | 340, 122, NUMA6, 342, X | 340, 122, NUMA6, 342, IMCU324 |
| 342, 102, NUMA4, 346, IMCU326 | 342, 102, NUMA4, 346, X | 342, 102, NUMA4, 346, X |
| 348, 102, NUMA4, 350, IMCU326 | 348, 102, NUMA4, 350, X | 348, 102, NUMA4, 350, X |

802 → Group 820 (rows 1–6)
804 → Group 822 (rows 7–12)

FIG. 8

MEMORY-AWARE JOINS BASED IN A DATABASE CLUSTER

RELATED APPLICATION DATA AND CLAIM OF PRIORITY

This application claims the benefit of
U.S. Provisional Application No. 62/027,535 entitled "Distribution Of An Object In Volatile Memory Across A Multi-Node Database", filed Jul. 22, 2014;
U.S. Provisional Application No. 62/027,695 entitled "Framework for Volatile Memory Query Execution in a Multi-Node Database" filed Jul. 22, 2014; and
U.S. Provisional Application No. 62/027,703, filed Jul. 22, 2014,
the contents of all three of which are incorporated by reference for all purposes as if fully set forth herein. This case claims priority as a continuation in part of:
U.S. application Ser. No. 14/565,906, filed Dec. 10, 2014 entitled "DISTRIBUTION OF AN OBJECT IN VOLATILE MEMORY ACROSS A MULTI-NODE CLUSTER"; and related to:
U.S. application Ser. No. 14/805,949, filed on the same day herewith entitled, "FRAMEWORK FOR VOLATILE MEMORY QUERY EXECUTION IN A MULTI-NODE CLUSTER"
the contents of both of which are incorporated herein by reference as if fully disclosed herein.

FIELD OF THE INVENTION

The present invention relates to data storage and retrieval techniques in a database cluster, and more specifically to memory-aware joins in a database cluster.

BACKGROUND

One of the most basic operations performed against data in a database is the join operation. A join is used to combine multiple tables, so data from those tables may be selected in a query. A query that joins two tables specifies how the tables are joined. For example, a query may specify that rows in a first table only join with rows in a second table when the rows in the first table have a value in a particular column that matches the value in a particular column of rows in the second table. The column that contains the values that determine which rows of the first table join with which rows of the second table is referred to as the "join" column.

In a database cluster, the work of combining data from multiple tables and evaluating the conditions used to join the tables may be distributed across multiple nodes. Each node works on a small subset of data individually, and then relays the results to a single node. For example, assume a query joins a first table with a second table. The first table has rows A, B, C, and the second table has rows D, E, F. To distribute the work required by this query, one node in the cluster compares row A with rows D, E, F; another node compares row B with rows D, E, F, and a third node compares row C with rows D, E, F. Once all of the possible combinations of rows are evaluated, a single node aggregates the results and responds to the query.

A partition-wise join (PWJ) significantly reduces the work required to perform a query that joins multiple tables. Before evaluating the conditions of a query that joins two tables, the joined tables are separated into sub-tables, referred to as partitions, based on the values of the join column. Each partition has rows containing a set or range of values for the join column. When a query joins the two tables based on the values from the join column, the work for the join query is distributed based on partition. Each node performs a smaller join on a partition from each table containing the same set or range values, rather than comparing every row in one table against every row in another table.

For example, assume that each of the two tables from the previous example is partitioned into three partitions, and that "DATE" is the join column. Under these circumstances, each of the three partitions corresponds to a range of dates. For example, the first table may be divided into three partitions T1P1, T1P2, T1P3 that correspond to date ranges Jan. 1, 1980 to Dec. 31, 1989, Jan. 1, 1990 to Dec. 31, 1999, and Jan. 1, 2000 to Dec. 31, 2009. The second table may be divided into three partitions T2P1, T2P2, T2P3 that correspond to the same three date ranges Jan. 1, 1980 to Dec. 31, 1989, Jan. 1, 1990 to Dec. 31, 1999, and Jan. 1, 2000 to Dec. 31, 2009. For the purpose of explanation, it shall be assumed that rows A, B and C have dates that fall into partitions T1P1, T1P2 and T1P3, respectively, and that rows D, E, and F have dates that fall into partitions T2P1, T2P2 and T2P3, respectively.

When the two tables are joined based on the DATE column, the work distributed to each node becomes significantly less. Specifically, after the partitioning, both row A and row D are part of the same date range; row B and row E are part of the same date range; and row C and row F are part of the same date range. Using a partition-wise join, one node performs a join between T1P1 and T2P1 (which only requires row A to be compared with row D). Another node performs a join between T1P2 and T2P2 (which only requires row B to be compared with row E). Finally, a third node performs a join between T1P3 and T2P3 (which only requires row C to be compared with row F). Then the results are aggregated. Compared to the previous example, each node performs a third of the work in order to provide a result. Examples of partition-wise joins may be found in U.S. Pat. No. 6,609,131 filed Sep. 27, 1999, "PARALLEL PARTITION-WISE JOINS," filed by Mohamed Zait et al., the entire contents of which is hereby incorporated by reference as if fully set forth herein.

In a typical partition-wise join, the work of performing a smaller join between two partitions may be assigned to any node in the cluster. Each node is presumed to have equally-fast access to the same on-disk copy of the partitioned tables, and any node may access any partition of any table. However, equally-fast access to data is not true in systems that pre-load entire database objects, or portions thereof, into volatile memory before a query requests the data. Such systems are described, for example, in U.S. patent application Ser. No. 14/377,179, entitled "Mirroring, In Memory, Data From Disk To Improve Query Performance", filed Jul. 21, 2014, the contents of which is incorporated herein in its entirety. In such systems, assigning partition-wise join operations to nodes based on the assumption that all nodes have equally-fast access to all data may often lead to sub-optimal results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3B is a block diagram illustrating a chunk-to-node mapping;

FIG. 3C is a block diagram illustrating a chunk-to-node mapping for a partitioned table;

FIG. 8 is a block diagram illustrating a chunk to instance mapping for redundantly hosted chunks in a multi-node database cluster;

DETAILED DESCRIPTION

Figure 1:
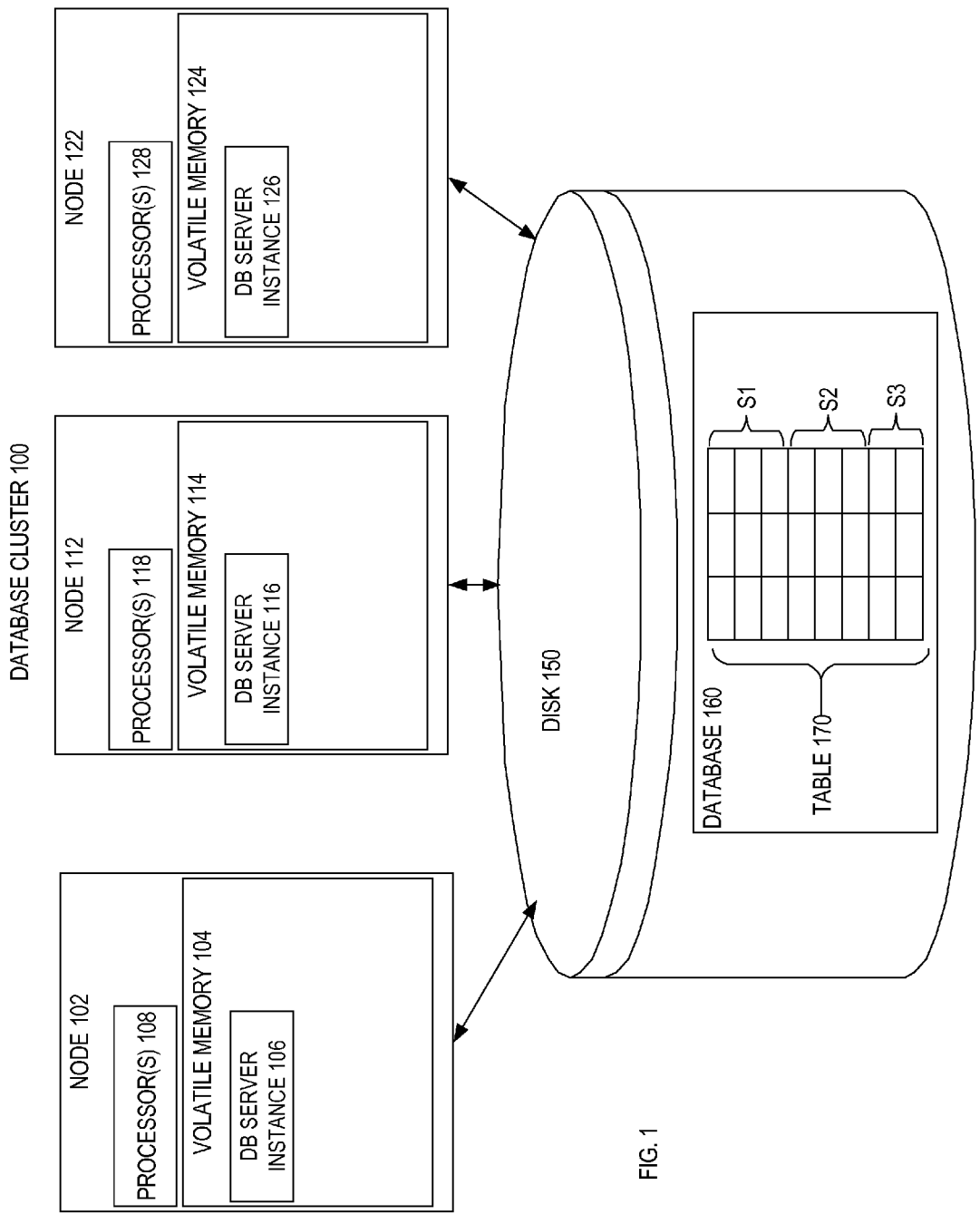
FIG. 1 is a block diagram illustrating a system architecture of a database cluster.

In the following description, for the purposes of explanation, numerous specific details are set forth in order to provide a thorough understanding of the present invention. It will be apparent, however, that the present invention may be practiced without these specific details. In other nodes, well-known structures and devices are shown in block diagram form in order to avoid unnecessarily obscuring the present invention.

General Overview

The in-memory version of an object (or selected portions thereof) is referred to herein as an In-Memory Copy (IMC), or alternatively, as an In-Memory Compression Unit (IMCU) because the data contained therein is often compressed. The performance of a cluster increases dramatically when a node that is performing a partition-wise join is able to use the in-memory copy of one or more of the partitions involved in the join, rather than having to retrieve all of the data from disk.

With the in-memory data preloaded into the volatile memory of one or more nodes in the cluster, the portion of work for performing a smaller join between two partitions may be greatly expedited if the work is sent to a node with some of the necessary data already located in its local volatile memory. Unfortunately, accessing each node to determine which IMCs are located in a given node's volatile memory is a slow process. Furthermore, after determining which IMCs are located in each node, the query coordinator must still determine how to divide a join specified in a query into smaller join operations to distribute to the various nodes.

Techniques are described herein for distributing distinct portions of database objects across the volatile memories of a plurality of nodes in a clustered database system. The portion of a database object that is assigned to any given node is referred to herein as a "chunk". A node that has been assigned to store an IMC of a chunk is referred to as a "host" of the chunk. A database object whose chunks have been pre-loaded into the volatile memories of multiple host nodes is referred to herein as a "pre-loaded object".

In some embodiments, within the volatile memory of a host node, each chunk of a pre-loaded object is encapsulated in a distinct IMCU. In alternative embodiments, the in-memory representation of a chunk may have other formats, including the same format in which the data for the chunk is represented on disk. Spreading the chunks of a pre-loaded object across multiple host nodes increases parallelism and avoids the situation in which the same data is consuming volatile memory in every one of the nodes.

In addition, techniques are described herein that allow each node to determine which chunks of a pre-loaded object are hosted at which nodes in the cluster, without having to centralize the task of keeping track of the chunk-to-node mapping. In one embodiment, each node is able to independently determine the correct host node for any given chunk of a pre-loaded object.

In addition, techniques are described herein for executing queries against pre-loaded objects. In one embodiment, each of the multiple nodes maintains a sub-chunk-to-node mapping that indicates how data on disk corresponds to the data that has been distributed across the volatile memories of the host nodes. Using this sub-chunk-to-node mapping, any database instance in the cluster may generate a query execution plan for a query that targets a pre-loaded object. Based on the sub-chunk-to-node mapping, such query plans can take advantage of the object's chunks that have been pre-loaded into the volatile memory of a host node.

Additional techniques are described herein for loading the same chunk of an object into the volatile memories of multiple host nodes. When the same chunk has been loaded into multiple host nodes, the work of a first query that accesses the chunk is sent to one of the host nodes of the chunk, while work of a second query that accesses the chunk is sent to another of the host nodes of the chunk. Thus, the work of accessing the data in that chunk may be executed in parallel by the various host nodes of the chunk. In addition, if one of the host nodes of a particular chunk fails, the query execution plan for a query that requires access to the particular chunk may be augmented to leverage the copy of the chunk that is in a host node of the chunk that did not fail.

A partitioned object is an object that has been partitioned into sub-objects, referred to herein as partitions. When a partitioned object is divided into chunks that are preloaded into the volatile memories of host nodes, the partitioned object is referred to as a "pre-loaded partitioned object".

When a join operation is executed against two objects that have been partitioned, it is often possible to perform that join by executing a number of smaller partition-wise joins. For example, if a table T1 is divided into partitions T1P1 and T1P2, and a table T2 is divided into partitions T2P1 and T2P2, then it may be possible to execute the join between T1 and T2 by performing a partition-wise join between T1P1 and T2P1, and a partition-wise join between T1P2 and T2P2.

Techniques are described herein for executing in memory partition-wise joins in a manner that takes advantage of pre-loaded partitioned objects. An in memory partition-wise join refers to a partition-wise join in which at least one of the partitions involved in the join has already been pre-loaded into volatile memory. When a partitioned database object is pre-loaded, all chunks belonging to any given partition are distributed to the same host node. For example, if table T is partitioned into partitions P1, P2 and P3, and partition P1 is divided into chunks P1C1 and P1C2, then P1C1 and P1C2 would be distributed to the same host node. In some embodiments, rather than creating a chunk-to-node mapping, each node may independently create a partition-to-node mapping. This allows any node in the cluster to act as a parallel query coordinator when receiving a query that requires work to be performed against a pre-loaded partitioned object.

When a query requires a join between rows of partitioned tables, the join operation required by the query is converted to multiple partition-wise join operations, and work granules that correspond to partition-wise join operations are generated. Those partition-wise join operations are assigned to nodes by a query coordinator based on the partition-to-node mapping located in the node of the query coordinator. The work granules are thus distributed in such a way that partition-wise join operations are sent to the nodes that have IMCs of the partitions involved in the partition-wise join operations, so that partition-wise joins may be executed against IMCs of corresponding partitions.

The parallel query coordinator preferably assigns the partition-wise join operations to nodes with the necessary partitions already residing in local volatile memory. To increase performance of the cluster, it is desirable to have "hits" where each partition-wise join is executed against data already residing entirely in the corresponding host node's local volatile memory.

A table that is partitioned on-disk in multiple ways is referred to as a composite partitioned table. Composite partitioned tables are described, for example, in U.S. Pat. No. 6,665,684, entitled "PARTITION PRUNING WITH COMPOSITE PARTITIONING", the contents of which is incorporated herein by reference. For example, a composite partitioned table may be partitioned using range-based partitioning on a first column, and then further sub-partitioned using hash-based partitioning on a second column. Each sub-partition in this table would belong to a unique range-hash partition combination. According to one embodiment, when an object is composite partitioned with both range and hash partitioning, data from partitions is preloaded into the volatile memories of nodes based on the hash partition to increase the likelihood of being able to perform an in-memory partition-wise join.

System Overview

Referring to FIG. 1, it is a block diagram that depicts a database cluster 100 according to one embodiment. In the embodiment illustrated in FIG. 1, three nodes 102, 112 and 122 have access to the same database 160. For the purpose of illustration, database 160 is shown as stored on a single shared disk 150, but in alternative embodiments may be spread across multiple disks to which each of nodes 102, 112 and 122 have access.

Nodes 102, 112 and 122 respectively have one or more processors 108, 118 and 128, and local volatile memory 104, 114 and 124. In addition, nodes 102, 112 and 122 are respectively executing database server instances 106, 116 and 126. While in the illustrated embodiment each node is executing a single database server instance, in alternative embodiments a single node may execute more than one database server instance.

Database 160 includes a table 170. Each of nodes 102, 112 and 122 is able to access data items from table 170 from the copy of table 170 that resides on disk 150. However, it is much faster for any given database server instance to access data items of table 170 that are cached in the volatile memory that resides on the node in which the database server instance is executing.

Table 170 is composed of three segments (S1, S2 and S3), where a "segment" is one or more extents, and where an "extent" is a contiguous series of on-disk data blocks. According to one embodiment, if segment S1 of table 170 has been designated as "in-memory enabled", distinct chunks of segment S1 are loaded into each of volatile memories 104, 114 and 124. The loading of the chunks of segment S1 into volatile memories 104, 114 and 124 may be performed pro-actively, or on an as-needed basis. How nodes 102, 112 and 122 determine which chunks of segment S1 are to be loaded into each of nodes 102, 112 and 122 shall be described in greater detail hereafter.

For the purpose of illustration, individual segments of a table are divided into chunks that are distributed among the various nodes of a multi-node system. However, entire table partitions, or entire tables, may be memory-enabled and divided into chunks that are distributed among the various nodes of a multi-node system. The granularity at which the chunks are determined may vary from implementation to implementation, and the techniques described herein are not limited to any particular level of granularity.

Factors in Distributing Chunks of a Database Object Among Nodes

When loading distinct chunks of a segment into the volatile memory of multiple nodes, various factors are taken into account to improve overall query processing performance. For example, during query processing, it is desirable for each of nodes 102, 112 and 122 to perform, in parallel, an approximately equal amount of work. To increase the likelihood that the query processing workload will be balanced, it is desirable for each of nodes 102, 112 and 122 to have approximately the same amount of data from the segment.

In addition, it is important for the distribution scheme to be able to handle situations in which a node fails and/or new nodes are added to the cluster 100. Ideally, rebalancing the workload when such events occur should involve as little downtime and as little inter-node traffic as possible.

Further, it is desirable to minimize cross-node communication required for each of the nodes to determine which chunks are assigned to each of the other nodes. As shall be described in greater detail hereafter, such cross-node communication is minimized by decentralizing the chunk-to-node mapping functions so that each node may independently determine the same chunk-to-node mapping.

Ideally, whether chunks of a segment are distributed across multiple nodes in a cluster should be transparent to the database applications that are sending queries to the cluster. Consequently, techniques are described herein where database applications can send queries that target a memory-enabled segment without having to know or specify which node(s) have the in-memory version of the segment. Such queries may be sent to the database server instance on any of the cluster's nodes, and that database server instance will return the correct results regardless of whether chunks of the in-memory version of the segment are distributed across multiple nodes.

Lock Managers

According to one embodiment, the locks for any given segment are managed by one of the nodes in the cluster. The node that manages the locks for a segment is referred to herein as the "lock-manager" for that segment. According to one embodiment, the segment-to-lock-manager mapping is based on an identifier associated with the segment. Consequently, given the segment identifier, any node in the cluster 100 is able to determine the lock manager for of any segment.

For the purposes of illustration, it shall be assumed that the lock managers for segments S1, S2 and S3 of table 170 are nodes 102, 112 and 122, respectively. As shall be described in greater detail hereafter, the lock-manager for a segment will receive a lock request from one or more nodes in response to occurrence of an event that triggers the loading of the segment. Events that trigger the loading of a segment are referred to herein as "load-segment events".

Load-Segment Events

A load-segment event is an event that triggers the loading, into volatile memory, of a segment. Various events may trigger the loading of a segment of a memory-enabled object into volatile memory. For example, in some cases, a segment of a memory-enabled object may be loaded into volatile memory upon system start up. In other cases, loading a segment of a memory-enabled object into volatile memory may be triggered by receiving a query that targets data items from the segment of the memory-enabled object. In yet other cases, a database application may submit an explicit request for a particular segment of a memory-enabled object to be loaded into volatile memory. The techniques described herein are not limited to any particular load-segment event.

According to one embodiment, a load-segment event includes a node determining that the segment has not already been loaded into the volatile memory of any node. Such a check may involve inspecting metadata, within the volatile memory of the node performing the check, that indicates which segments have been loaded by any node.

Becoming Load-Operation Master

In a multi-node cluster, a load-segment event for the same segment may concurrently occur in multiple database server instances. For example, a load-segment event for segment S1 of table 170 may occur in both database server instances 116 and 126. According to one embodiment, each of database server instances 116 and 126 responds to occurrence of their respective load-segment event by attempting to obtain an exclusive lock to become the "master" of the load-segment operation for segment S1. The master of a load-segment operation is referred to herein as the "load-operation master". In the present example, because node 102 is the lock manager for segment S1, database server instances 116 and 126 would send a lock request to node 102. An exclusive lock that enables a database server instance to become the master of a load-segment operation is referred to herein as "load-master lock."

For any given load-segment operation, the lock manager of the segment grants only one database server instance the load-master lock. The database server instance that is granted the load-master lock thereby becomes the load-segment master. For the purpose of explanation, it shall be assumed that database server instance 126 on node 122 is granted the load-master lock for segment S1, and that the request from database server instance 116 is declined. In response to having its request declined, database server instance 116 ceases to wait for the load-master lock.

Dividing the Target Segment into Chunks

The database server instance that becomes the load-operation master for a particular segment is responsible for coordinating the loading of that segment into volatile memory. According to one embodiment, the load-operation master reads from a shared disk (e.g. disk 150) metadata that is associated with the segment that is to be loaded. The segment to be loaded is referred to herein as the "target segment".

The metadata associated with the target segment defines the extents that belong to the target segment. Because the disk blocks of an extent are contiguous, an extent may be defined, for example, by (a) the address of the first block in the extent and (b) the length of the extent.

In addition to reading the metadata, the load-operation master determines the desired size and number of chunks for the target segment. A chunk is a set of data, from the target segment, that is to be loaded into the same in-memory container. The number of chunks need not be based on the number of extents in the target segment. Various factors may be used to determine the desired number of chunks, including, for example, the number of nodes in the cluster.

For the purpose of explanation, it shall be assumed that the in-memory containers for the segment will be in-memory copys. Because the contents of in-memory copys may be compressed, the size the data occupies on disk is not necessarily the same size that the data will occupy in an in-memory copy. Thus, a predicted in-memory size of the data may also be a factor used to determine the on-disk size of the chunks. For example, one rule for breaking up a target segment may be that the predicted in-memory size of each chunk may not fall below a certain threshold size. Such a rule would ensure that a target segment is not divided into chunks that are so small that the benefit that results from distributing the chunks among distinct nodes does not outweigh the overhead costs of distributing the work among so many nodes. In one embodiment, for example, the decision about how to divide the target segment into chunks may be (a) if pims/N>min_size, then divide segment into N equal-sized chunks, and (b) if pims/N<min_size, then divide segment into M equal-sized chunks, where:

"pims" is the predicted in-memory size of the target segment

Figure 2:
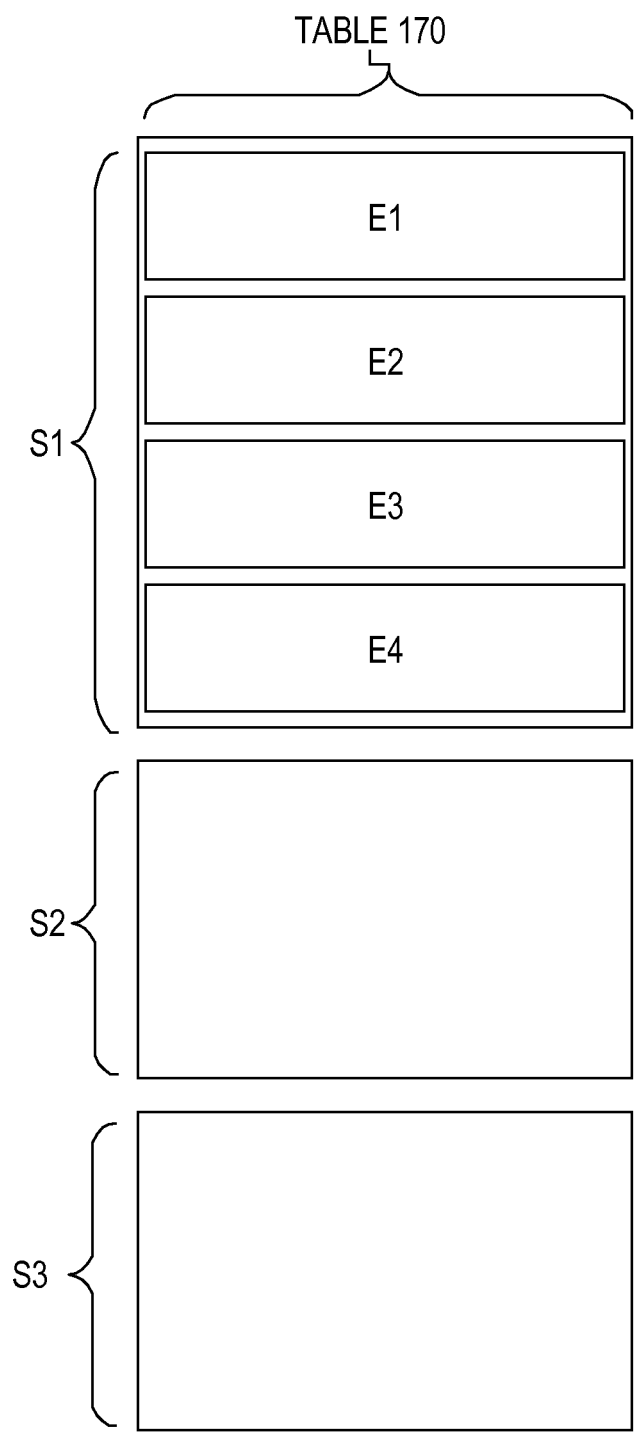
FIG. 2 is a block diagram illustrating a database object composed of segments and segments composted of extents.
Figure 3A:
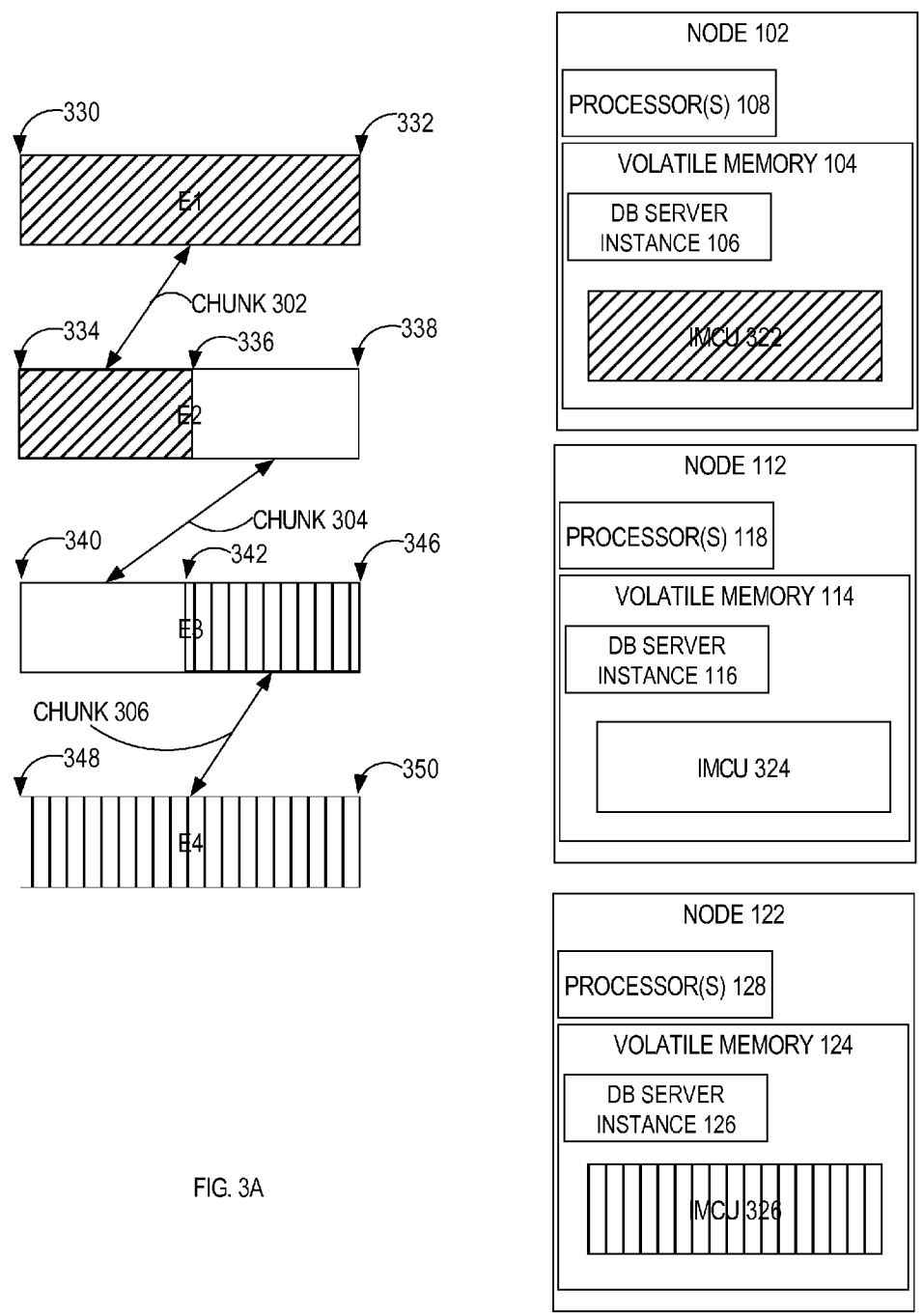
FIG. 3A is a block diagram illustrating a database object divided into chunks and distributed across volatile memory.

"N" is the number of nodes available in the system min_size=minimum threshold for IMC size M=the highest number by which pims may be divided to produce chunks whose in-memory size is greater than min_size For the purpose of explanation, it shall be assumed that segment S1 has four extents E1, E2, E3 and E4, as illustrated in FIG. 2. It shall be further assumed that database server instance 126 determines that data from these four extents (E1, E2, E3, E4) should be divided into three chunks. Referring to FIG. 3A, it illustrates how the four extents of S1 may be mapped to three chunks 302, 304 and 306. Specifically, data for the first chunk 302 includes all data from extent E1, and some data from extent E2. Data for the second chunk 304 includes the rest of the data from extent E2, and some of the data from extent E3. Finally, data for the third chunk 306 includes the rest of extent E3 and all of extent E4.

Determining Chunk Assignments

Once the data for each chunk has been determined, the load-operation master determines which node will host the IMC for each chunk. According to one embodiment, the node that is assigned to host the IMC of any given chunk is determined by applying a hash function to a unique identifier associated with the chunk. For the purpose of illustration, it shall be assumed that the starting address of each chunk is used as the unique identifier for the chunk. However, in alternative embodiments, any other unique identifier for the chunk may be used. In one embodiment, the hash function used for these assignments is a rendezvous hash function. Rendezvous hashing is described in detail at en.wikipedia.org/wiki/Rendezvous_hashing.

In the present example, the rendezvous hash function is applied to the address 330 of the first block of extent E1 to determine the node that is to host the IMC of chunk 302. According to one embodiment, applying an address 330 to the rendezvous hash function involves:

concatenating a unique identifier of each node (for example the numbers 102, 112, 122) to the address 330, to produce one hash key for each node applying the hash function to each of the three hash keys to produce three hash values, each of which corresponds to one of the nodes the node that corresponds to the highest hash value thus produced is assigned to host the particular node.

In a similar manner, the hash function is used to determine, based on address 336, the node that is to host the IMC of chunk 304, and to determine, based on address 342, the node that is to host the IMC of chunk 306. Rendezvous hashing naturally produces desirable effects such as minimal reshuffling during redistribution because the hash values of a particular node/chunk combination do not change, even upon failure of other nodes.

For the purpose of illustration, it shall be assumed that addresses 330, 336, and 342 hash to nodes 102, 112 and 122, respectively. Consequently, node 102 is assigned to host the IMC for chunk 302, node 112 is assigned to host the IMC for chunk 304, and node 122 is assigned to host the IMC for chunk 306. These assignments are illustrated in the chunk-to-node mapping table in FIG. 3B.

Communicating Chunk Assignments

Once the load-operation master has determined the chunk-to-node assignments, the load-operation master broadcasts a message to all other database server instances in cluster 100. According to one embodiment, the message includes various pieces of consistency information, including the target segment metadata (e.g. start address and size of the extents of the target segment), "snapshot information", a list of the database server instances that have been assigned chunks, and "chunk size information".

Snapshot information is information that indicates the state of the target segment that was seen by the load-operation master. The snapshot information is important because that snapshot of the target segment was the basis for the chunk determinations made by the load-operation master. Chunk size information indicates the size of each of chunks 302, 304 and 306. In the case where all chunks are the same size, the chunk size information may be a single size value.

The techniques described herein are not limited to all information being transferred at a single time. For example, the single size value may be pre-stored in each instance to eliminate the need for transferring chunk size information. Along the same lines, in cases where the segment is distributed across all functioning nodes. A list of functioning nodes may be maintained in each instance independently to eliminate the need for transferring a list of database servers that have been assigned chunks.

According to one embodiment, the snapshot information contained in the message sent by the load-operation master may include a snapshot time and an indication of the end of the last extent of the target segment that was seen by the load-operation master. In the present example, the last extent seen by database server instance 126 when making the chunk determination was extent E4. Thus, the snapshot information may include the address 350 of the end of E4. This snapshot information is useful because, between the time the load-operation master determines the chunks and the time the data will actually be loaded, extent E4 may have grown and/or additional extents may have been added to the target segment. Any such post-snapshot data should not be part of the load operation.

The snapshot time indicates the system time at which the load-operation master read the metadata of the target segment. As shall be described hereafter, the snapshot time is used when loading the chunks into memory to ensure that the loaded data reflects the state of the chunks as of the snapshot time.

After sending the message, the load-operation master downgrades the load-master lock from an exclusive lock to a shared lock. In the present example, upon downgrading the load-master lock, database server instance 126 ceases to be the load-operation master for segment S1, and other database server instances can have shared access to segment S1.

Parallel Load Operations

Upon receiving the message from the load-operation master, all nodes that have been assigned to host a chunk send to the lock manager of the target segment a request for a shared mode lock on the target segment. Once the load-operation master has released the exclusive mode lock on the target segment, the lock manager of the target segment grants those shared mode locks.

With the snapshot information and the chunk size information, each database server instance is able to determine the boundaries of each chunk. Having determined the boundaries, each database server instance may apply the same hash function that was used by the load-operation master to determine the chunk-to-node mapping. Thus, in the present example, every database server instance in cluster 100 determines that:

chunk 302 includes address ranges 330-332 and 334-336 and is assigned to node 102 chunk 304 includes address ranges 336-338 and 340-342 and is assigned to node 112 chunk 306 includes address ranges 342-346 and 346-350 and is assigned to node 122

Based on this information, each database server instance may build the chunk-to-node mapping illustrated in FIG. 3B. After determining the chunk assignments, each database server instance that has been assigned a chunk proceeds to load the chunk into its local volatile memory. The data of a chunk is read from disk as that data existed at the snapshot time indicated in the message from the load-operation master. Consequently, for the in-memory version of a chunk, data items that were changed after the snapshot time are rolled back to the state in which they existed as of the snapshot time. Such roll-back operations may be performed, for example, based on undo information maintained by the database system.

As mentioned above, the format of the chunk within volatile memory may vary from implementation to implementation. In an embodiment where chunks are transformed into IMCs, the loading of the chunk may involve reformatting and/or compressing the data item from the chunk. FIG. 3A illustrates the state of cluster 100 after chunks 302, 304 and 306 have been loaded into nodes 102, 112 and 122, respectively, to create IMCs 322, 324 and 326.

Sub-Chunk-to-Node Mappings

Figure 4:
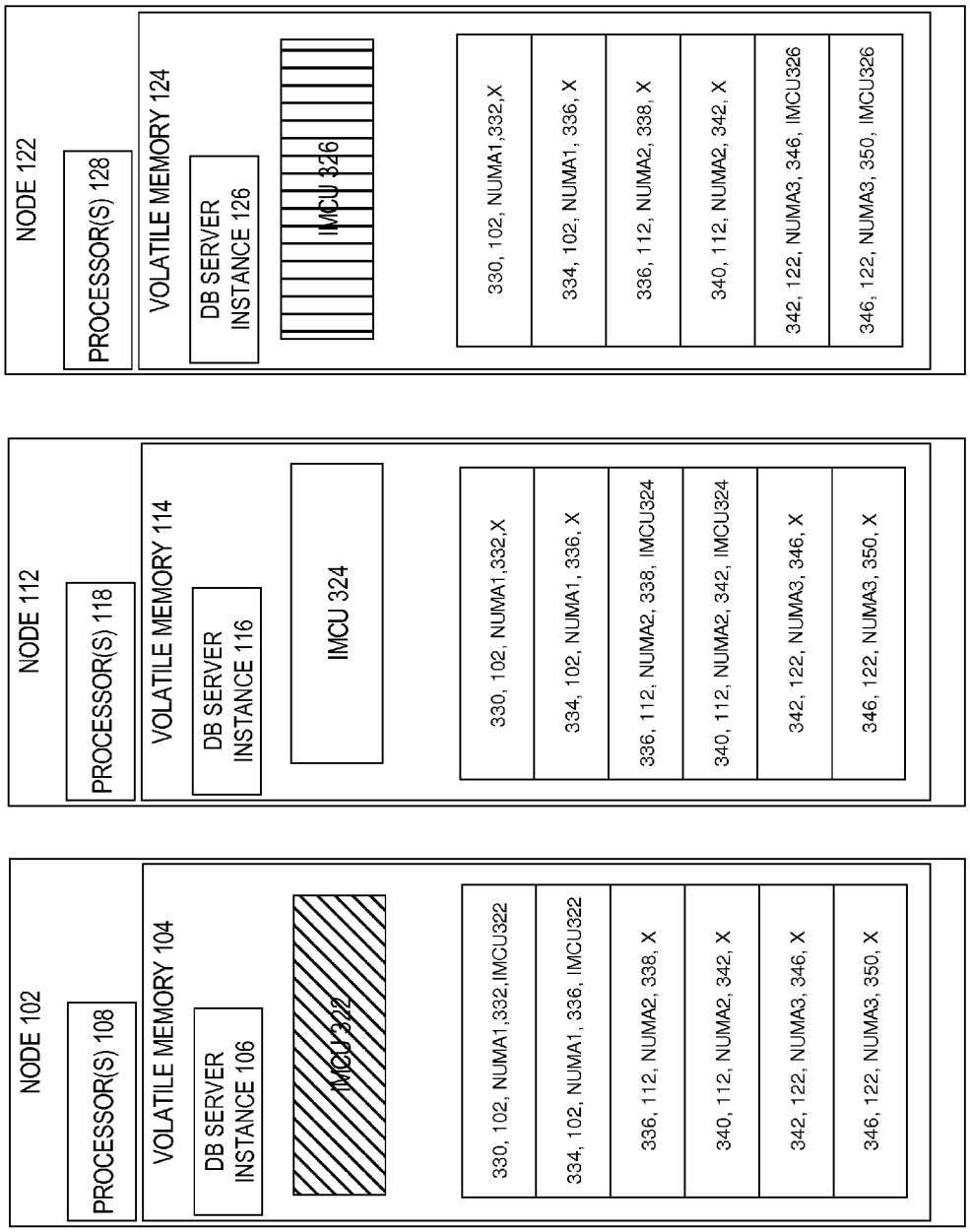
FIG. 4 is a block diagram of a distributed database object in volatile memory of three nodes with an associated chunk-to-node mapping.

A "sub-chunk" refers to a contiguous set of disk blocks with endpoints that align with endpoints from either an on-disk extent or the chunk to which the sub-chunk belongs. Typically, a chunk will have at least as many sub-chunks as the number of extents that are spanned by the chunk. For example, each of chunks 302, 304 and 306 span two extents, so each of chunks 302, 304 and 406 have two sub-chunks. In addition to loading any chunk that is assigned to it, each database server instance in cluster 100 stores in its local volatile memory metadata that reflects sub-chunk-to-node mappings that were determined from the information in the message. FIG. 4 is a block diagram that illustrates the sub-chunk-to-node mapping information maintained by nodes 102, 112 and 122, according to one embodiment. In the embodiment illustrated in FIG. 4, each entry in the sub-chunk-to-node mappings a sub-chunk, and has the form (start address, host node, host socket, end address, IMC pointer), where:

"start address" is the starting disk address of the corresponding sub-chunk

"host node" is the node that is assigned to host the chunk that contains the corresponding sub-chunk "host socket" is the NUMA socket, within the host node, that has most efficient access to the portion of volatile memory containing the IMC that contains the corresponding sub-chunk (NUMA-based embodiments shall be described in greater detail hereafter).

"end address" is the end disk address of the corresponding sub-chunk

"IMC pointer" is a pointer to the location, within local volatile memory, of the IMC that contains the data of the corresponding sub-chunk Thus, the first entry in the sub-chunk-to-node mappings within node 102 indicates:

"start address"=address 330 (the start of extent E1)

"host node"=node 102

"host socket"=socket 1 within node 102.

"end address"=address 332 (the end of extent E1)

"IMC pointer"=IMC322 (which represents the starting address, within volatile memory 104, of IMC 322).

According to one embodiment, entries maintained by one node for sub-chunks that are assigned to another node do not have all pieces of information. For example, the third entry in the sub-chunk-to-node mappings of node 102 indicates:

"start address"=address 336 (the start of chunk 304)

"host node"=node 112

"host socket"=socket 2 within node 112.

"end address"=address 338 (the end of extent E2)

"IMC pointer"=X (which indicates that no value is provided).

No IMC pointer value is provided for sub-chunks that are stored in the volatile memory of other nodes because such information is not meaningful to a node that cannot directly access that volatile memory.

NUMA Systems

In non-uniform memory access (NUMA) systems, different computing units within the same node have different access rates to different portions of the local volatile memory. The computing units may correspond to multiple processors within the same node and/or multiple cores within a single processor.

As an example of non-uniform access, assume that a node includes computing units A, B and C, each of which has access to the same local volatile memory. Computing unit A may have faster access to address range 1 of that volatile memory, and slower access to ranges 2 and 3. On the other hand, computing unit B may have faster access to range 2, and slower access to ranges 1 and 3. Finally, computing node C may have faster access to range 3, and slower access to ranges 1 and 2.

In such systems, the load operation master may not simply assign chunks to nodes, but may assign chunks to (node/computing unit) combinations. The selection of which computing unit to assign to a chunk may be performed using a hash function in a manner similar to the database server instance-selection technique described above. When a node receives the message from the load-operation master that assigns a chunk to a particular computing unit of the node, the node loads that chunk into the range of volatile memory to which the designated computing unit has faster access.

Redistribution of Chunk Assignments

When a node fails, the IMCs stored in that node's volatile memory cease to be available for query processing. When a new node is added to a cluster, the volatile memory of the new node becomes available for storing IMCs. In both of these scenarios, reassignment of some IMCs is necessary for optimal operation of the cluster.

For example, if node 112 fails, IMC 324 is no longer available for processing queries that access data items that belong to chunk 304. Ideally, the redistribution of load assignments takes place without having to reassign chunks that are loaded into the nodes that did not fail. Thus, failure of node 112 should not cause chunk 302 or chunk 306 to be reassigned, because data from these chunks reside in the volatile memories of nodes 102 and 122, respectively, which have not failed.

The nature of a rendezvous hash function is such that keys only hash to nodes that are currently considered "candidates" for chunk assignments. Therefore, in response to the failure of node 112, node 112 ceases to be considered a candidate by the hash function. With the change to the set of candidate nodes, the starting addresses of chunks 302 and 306 that are assigned to the non-failed nodes will continue to hash to nodes 102 and 122 respectively. However, because node 112 has ceased to be a candidate, the starting address of chunk 304 will no longer hash to node 112. Instead, the starting address of chunk 304 may hash to node 102. This remains true until either node 102 fails or node 112 is recovered and established once again as a candidate. When node 112 is established once again as a candidate, the starting address of chunk 304 will once again hash to node 112.

Whenever a database server instance receives a request that targets a particular chunk, the database server instance uses the hash function to determine the host node of the particular chunk, and compares the hash-function-determined-host with the host node of the particular chunk indicated in the chunk-to-node map (the "map-specified-host"). If the database server instance determines that the hash-function-determined-host is different than map-specified-host, then the database server instance updates the corresponding entries for the particular chunk in its chunk-to-node mappings and its sub-chunk-to-node mappings. In addition, if a database server instance determines that it itself is the new host node of the particular chunk, then the database server instance loads the chunk into its volatile memory. On the other hand, if a database server instance determines that it itself was the old host node of the particular chunk, and that the particular chunk now maps to another node, then the database server instance can discard from its volatile memory the container that holds the data from the chunk.

For example, assume that, after node 112 fails, address 336 (the start of chunk 304) hashes to node 102 instead of node 112. Under these circumstances, database server instance 106 will detect the discrepancy:

node 102 is the hash-function-determined-host,
node 112 is the map-specified host In response to detecting this discrepancy, database server instance 106 will update the entries associated with chunk 304 to indicate that node 102 is now the host for chunk 304. Database server instance 106 will then proceed to load chunk 304 into its volatile memory 104, thereby creating a new copy of IMC 324. The new copy of IMC 324 may be built with data from a snapshot that is different than the snapshot used to create the original copy of IMC 324. As a result, already existing IMCs in live nodes will be of earlier snapshots and the new ones of later snapshots. However, as long as a query is issued at a snapshot later than the snapshot of the new IMCs, all existing and new IMCs can be used to process the query.

Figure 5:
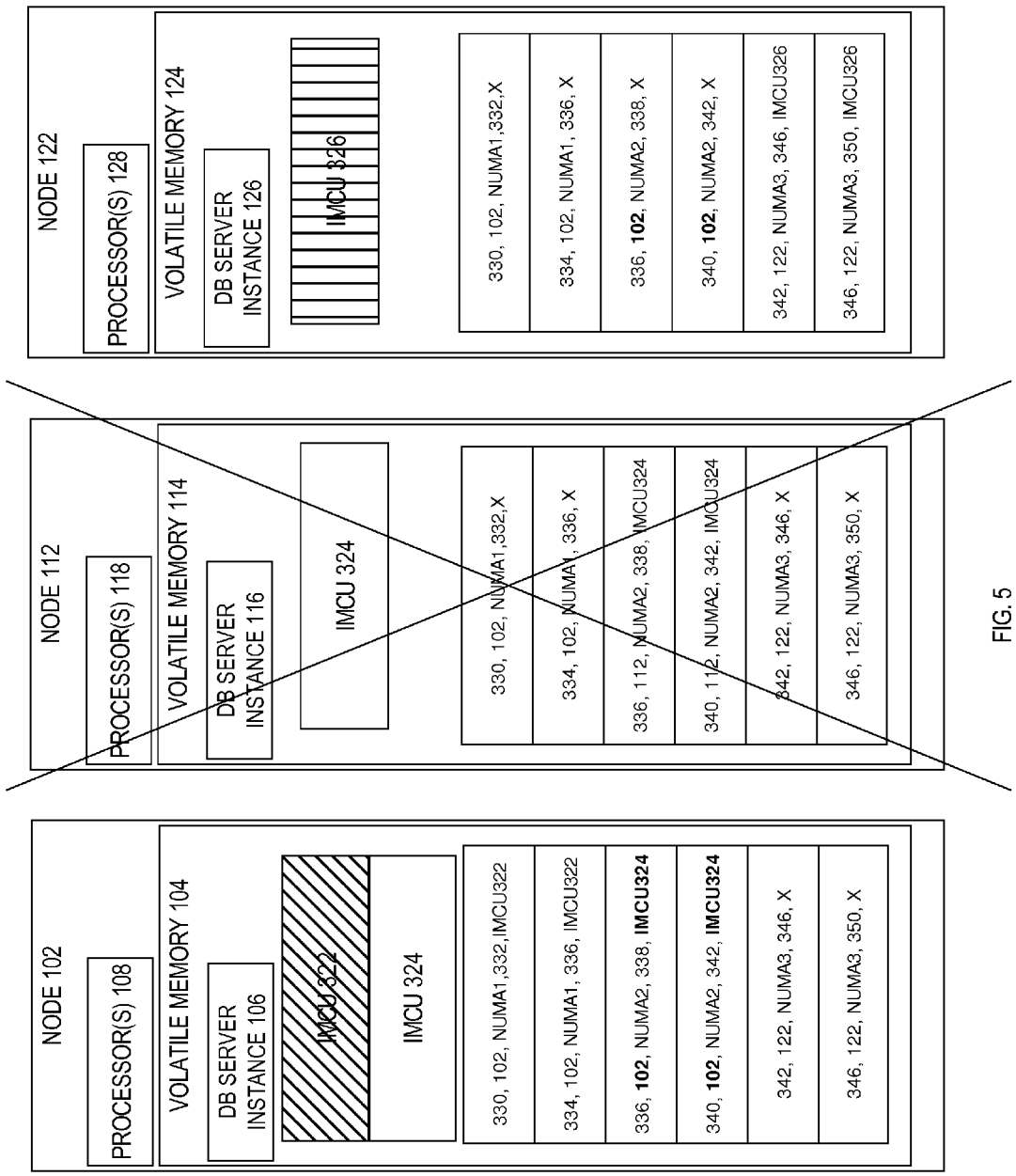
FIG. 5 is a block diagram illustrating a distributed database object in volatile memory of two nodes with an associated chunk-to-node mapping after a node failure has occurred.

Database server instance 126 will also detect the discrepancy and update the appropriate sub-chunk-to-node entries in its sub-chunk-to-node mapping. However, because database server instance 126 is not on the new host node, database server instance 126 will not load the chunk 304 into its volatile memory 124. Referring to FIG. 5, it illustrates the state of the cluster 100 after node 112 has failed, database server instances 106 and 126 have updated their sub-chunk-to-node mappings, and database server instance 106 has created the new copy of IMC 324 from the data in chunk 304.

When node 112 is recovered and established as a candidate, nodes 102 and 112 will once again detect discrepancies between the hash-function-determined host for chunk 304, and the map-specified host for chunk 304. In response to detecting these discrepancies, database server instances 106 and 126 will update their sub-chunk-to-node mappings. In addition, database server instance 106 discards its copy of IMC 324, and database server instance 116 creates a new copy of IMC 324 based on the data from chunk 304. Thus, cluster 100 returns to the state illustrated in FIG. 4.

Embodiments have been described herein in which a node that is assigned a chunk builds the IMC for that chunk from on-disk data. However, in alternative embodiments, a node that is newly-assigned to host a chunk may determine that a previous host of that chunk is available. This may occur, for example, when the new host is a node that is newly-added to a cluster, and the old host did not fail. Under these circumstances, the new host may request the old host to send the corresponding IMC data to the new host over the node-to-node interconnect. While sending IMC data from one host to another may result in a significant amount of message traffic, the overhead of that traffic may be less than the performance impact of rebuilding an IMC from on-disk data.

Handling Access Requests

IMCs 322, 324 and 326 are only useful if used to improve the performance of queries that access data in segment S1. Therefore, according to one embodiment, all database server instances in cluster 100 respond to queries that target data from segment S1 by breaking the operation requested by the query into work granules, and distributing those granules based on which node/database server instance/computing unit is hosting the targeted data.

For example, assume that database server instance 106 receives a query to scan the entire segment S1. In response, database server instance 106 creates a first set of one or more work granules to scan the data that resides in chunk 302, a second set of one or more work granules to scan the data that resides in chunk 304, and a third set of one or more work granules to scan data that resides in chunk 306.

After creating the three sets of work granules, database server instance 106 uses its local copy of the chunk-to-node mapping to determine that the first set of work granules should be performed locally by computing unit NUMA1. The second set of work granules should be sent to node 112 to be performed by computer unit NUMA2. The third set of work granules should be sent to node 122 to be performed by computing unit NUMA3.

Each node executes the work granules assigned to it, taking advantage of its local in-memory copy of the chunk that it is hosting. Each node then provides its results back to the node that received the query, and that node provides the results back to the database application that issued the query.

Consistent Maps Across the Nodes

Because each node is able to independently execute the hash function that is used to determine the distribution of chunks among the various nodes, each node is able to independently maintain its chunk-to-node mappings consistent with the mappings maintained by each other node, while requiring little to no cross-database server instance communication to keep the mappings in sync. Thus, the approaches described herein allow parallel query processing to take advantage of the increased amount of volatile memory available in a multi-node system, while minimizing the cross-database server instance communication required for each of the nodes to determine in which other node an in-memory version of each particular chunk has been loaded.

Techniques for Dividing a Query into Work Granules

When a database application desires data from database 160, the database application sends a query to any one of database server instances 106, 116 and 126. The database server instance that receives the query generates a query execution plan based on a locally-stored mapping of how the data is distributed across the volatile memories 104, 114, 124 of the multi-node cluster 100. This query execution plan specifies how the work required by the query is to be separated into work granules that perform work on data from chunks. For example, after consulting the mapping illustrated in FIG. 3B, the database server instance that receives a query that targets segment S1 of table 170 may divide the query into the following work granules:

a first work granule that performs work on data from segment S1 disk blocks in the address range 330-336,
a second work granule that performs work on data from segment S1 disk blocks in the address range 336-342,
a third work granule that performs work on data from segment S1 disk blocks in the address range 342-350.

The database server instance that generates the query execution plan for a query is referred to as the "parallel query coordinator" for the query. Based on the local chunk-to-node mapping, the parallel query coordinator sends the individual work granules to the database instances that reside in the host nodes of the chunks accessed by the work granules. The database server instances to which the parallel query coordinator sends work granules are referred to herein as "parallel query slaves". In the present example, the first, second and third work granules would be assigned to database server instances 106, 116 and 126, respectively.

The parallel query slaves then review their own local mappings, and process these work granules against the IMCs located in their own local volatile memory. The results produced by the parallel query slaves are sent to and aggregated by the parallel query coordinator. The parallel query coordinator then performs any necessary further processing on the data, and sends a response to the application that submitted the query.

Integrating Query Processing on In-Memory Data with On-Disk Data

Figure 6:
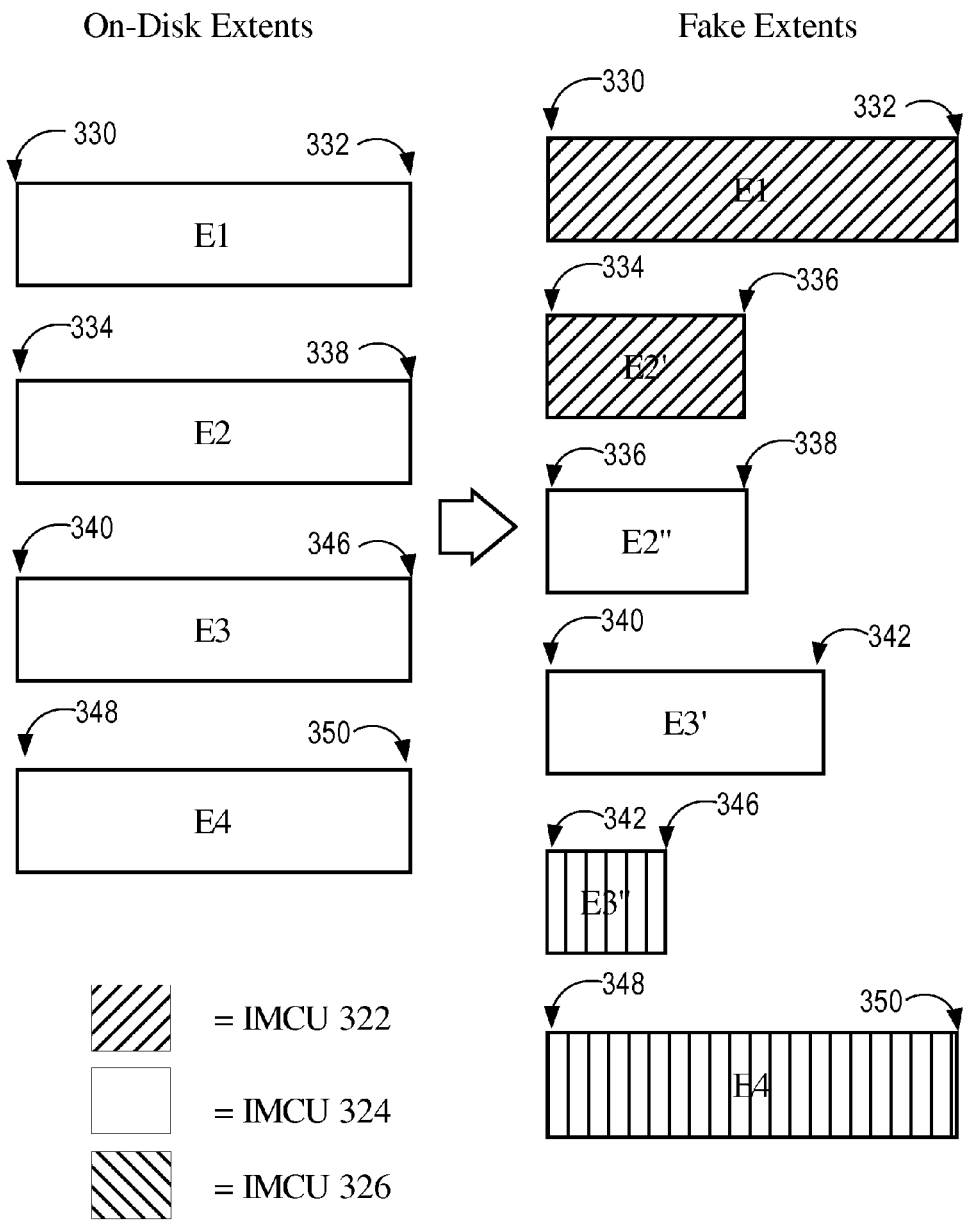
FIG. 6 is a block diagram illustrating how a parallel query coordinator divides a query directed toward data organized in persistent storage to optimize use of data organized in volatile memory.

Typically, before generating a query execution plan, the parallel query coordinator reviews what database objects the query is targeting and how those database objects are broken into extents. The parallel query coordinator then generates a query execution plan based on this extent data. However, for in-memory data, the data, as separated into extents on-disk, does not directly correspond with the data, as separated into chunks in-memory. Thus, when generating a query execution plan, the parallel query coordinator consults the local sub-chunk-to-node mapping presented in FIG. 4 to construct "fake" extents that align with the sub-chunk data. The term "fake extent" refers to an extent definition (e.g. start address and size) that does not necessarily correspond to an on-disk extent. For example, as illustrated in FIG. 6, extent E2 is an on-disk extent that starts at address 334 and ends at address 338. However, for the purpose of work granule creation, the first part of extent E2 (from address 334 to address 336) is treated as a first fake extent E2', and the second part of extent E2 (from address 336 to address 338) is treated as a second fake extent E2".

FIG. 6 is a block diagram illustrating how a parallel query coordinator divides the on-disk extents E1, E2, E3 and E4 into a different set of fake extents E1, E2', E2", E3', E3", and E4. Each of these fake extents is represented by a corresponding entry in the sub-chunk-to-node mappings illustrated in FIG. 4.

After breaking the work required by the query into work granules based on fake extents E1, E2', E2", E3', E3", and E4, the parallel query coordinator determines the host node for each of the fake extents and sends, to each host node, a single message that specifies the work of all work granules that are to be performed by that node. By sending all work that is to be performed by each host node in a single message, the host node is able to execute the work that corresponds to multiple fake extents by making a single pass over the chunk containing the sub-chunks for that fake extent. In the case where a chunk is compressed into an IMC, the host node is able to make a single pass over the IMC that stores the data for those fake extents.

For example, a parallel query coordinator may receive the query:
SELECT*FROM S1 WHERE C1=55;
The parallel query coordinator breaks up the query into work granules based on the fake extents. The parallel query coordinator then determines the host node to which the work granules are to be sent based on the mapping in FIG. 4. The parallel query coordinator then creates and sends one message to each host node, where each message indicates all work to be done by that host node. In the present example, the messages sent by the parallel query coordinator would distributed the work as follows:

Database server instance 106 is sent work to be performed on E1 and E2':
SELECT*FROM E1, E2' WHERE C1=55;
Database server instance 116 is sent work to be performed on E2" and E3':
SELECT*FROM E2", E3' WHERE C1=55;
And database server instance 126 is sent work to be performed on E3" and E4:
SELECT*FROM E3", E4 WHERE C1=55;

The parallel query slaves execute the queries against data divided into extents. When a parallel query slave receives a work granule against a particular fake extent, the parallel query slave determines, from its own local mapping as seen in FIG. 4, if the fake extent may be served from an IMC located in local volatile memory. Because the work granules for a given host node are sent in a single message, the IMC is only read once by the parallel query slave, rather than, for example, reading the IMC once for E1 and a second time for E2'.

If for some reason a parallel query slave is unable to process a work granule entirely by accessing data in local volatile memory, the parallel query slave may simply access some or all of the necessary data from disk.

In a NUMA system, the mappings may specify a particular computing unit, in addition to a host node location of an IMC, as seen in FIG. 4. When the mapping for a particular sub-chunk specifies a particular computing unit within a node, the work granule is sent to the designated node for execution by the designated computing unit.

Redundantly Hosted Chunks

Figure 7:
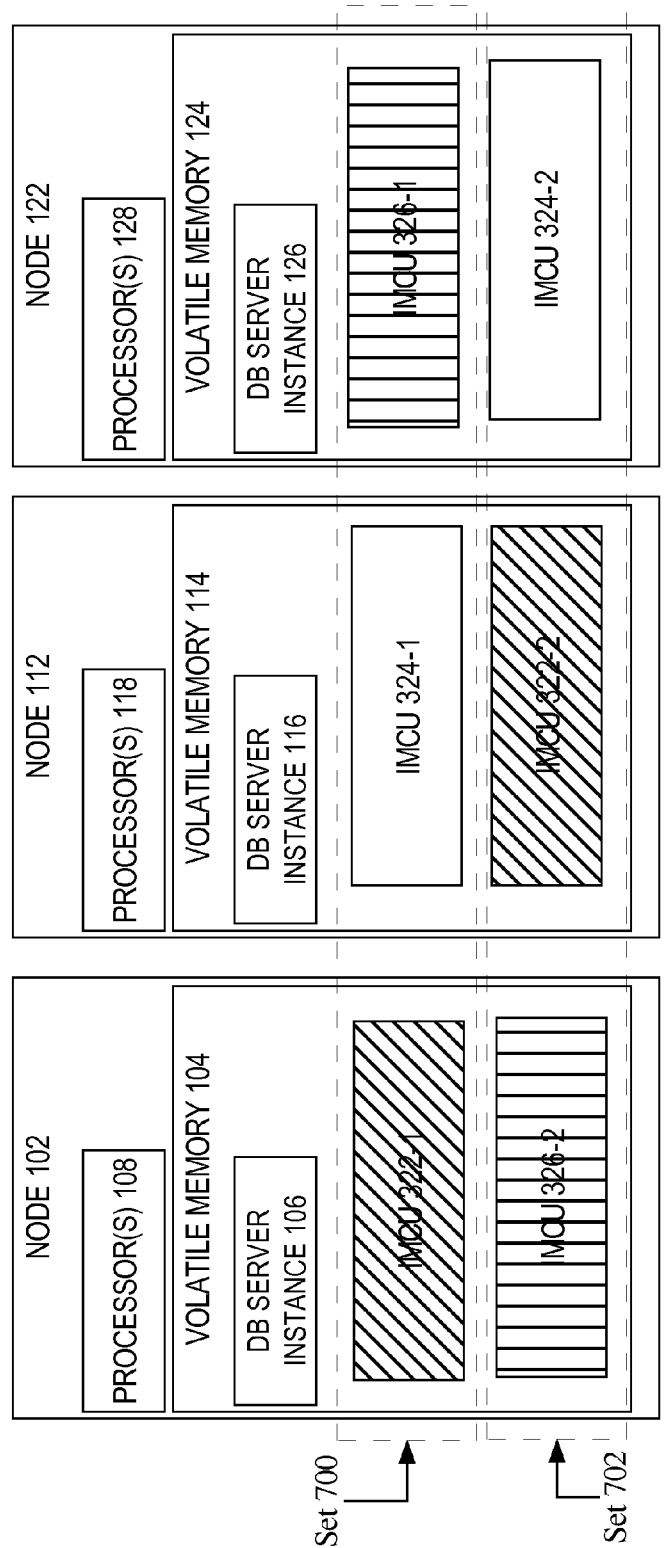
FIG. 7 is a block diagram illustrating redundantly hosted chunks in a multi-node database cluster.

According to one embodiment, the same chunk can be hosted at multiple nodes. FIG. 7 is a block diagram illustrating a how the chunks 302, 304 and 306 into which segment S1 has been divided may be redundantly hosted in a multi-node database cluster. FIG. 7 illustrates the state of cluster 100 after chunks 302, 304 and 306 have been redundantly loaded into nodes 102, 112 and 122. As illustrated in FIG. 7, chunks 302, 304 and 306 are distributed as follows:

Node 102 hosts a copy of IMC 322-1 (for chunk 302), and a copy of IMC 326-2 (for chunk 306)
Node 112 hosts a copy of IMC 324-1 (for chunk 304), and a copy of IMC 322-2 (for chunk 302)
Node 122 hosts a copy of IMC 326-1 (for chunk 306) and a copy of IMC 324-2 (for chunk 304)

In some embodiments, such as the embodiment depicted in FIG. 7, each chunk is loaded by some but not all of the database server instances 106, 116, 126.

Redundant loading may occur during parallel loading operations based on information communicated by the load operation master or by a configuration setting applied to all the database server instances.

Selecting Multiple Hosts for a Chunk

According to one embodiment, the same algorithm is used by all nodes to determine which nodes shall host each chunk. For example, in one embodiment, two database server instances are assigned to host an IMC of any given chunk by applying a hash function, such as a rendezvous hash, to N hash key values, where each of the hash key values corresponds to a distinct node. The hash key value for a node may be, as explained above, a unique identifier associated with the chunk concatenated to a unique identifier for the node.

Applying these N hash key values to the hash function will produce N hash values, each of which correspond to a node. The nodes associated with the two highest hash values are then selected as the two host nodes for the chunk.

As an alternative, hash values may be produced for each of the nodes, as described above. However, rather than select the nodes associated with the two highest hash values to be host nodes for the chunk, the node associated with the highest hash value may be selected to be the first host node. The second host node may then be selected based on which node comes next, after the first host node, in a particular order established for the nodes.

These are merely two ways in which multiple nodes may be selected to host a particular chunk. The techniques described herein are not limited to any particular technique for selecting multiple nodes to host a particular chunk.

IMC Sets

When chunks are redundantly hosted, the IMCs in the various nodes of the cluster may be divided into "IMC sets". According to one embodiment:

each IMC belongs to only one IMC set, and
each IMC set includes exactly one IMC for each chunk.

For example, as illustrated in FIG. 7, the IMCs in cluster 100 have been divided into two distinct IMC sets 700 and 702. Each of IMC sets 700 and 702 has an IMC for each of chunks 302, 304 and 306. Specifically, IMC set 700 includes IMCs 322-1, 324-1 and 326-1 that correspond to chunks 302, 304 and 306, respectively. Similarly, IMC set 702 includes IMCs 322-2, 324-2 and 326-2 that correspond to chunks 302, 304 and 306, respectively. IMC sets 700 and 702 differ with respect to the host node for each chunk. Specifically, in IMC set 700, chunk 302 is hosted in IMC 322-1 in node 102. However, in IMC set 702, the same chunk 302 is hosted in IMC 322-2 in node 112.

In the example illustrated in FIG. 7, each chunk has two host nodes. Consequently, the IMCs have been divided into two distinct IMC sets. However, in a system in which each chunk has three host nodes, the IMCs may be divided into three distinct IMC sets.

Mappings for Redundantly Hosted Sub-Chunks

As explained above, each database server instance independently creates and maintains its own sub-chunk-to-node mapping. When a sub-chunk is hosted by multiple nodes, each host node for the sub-chunk will have its own sub-chunk-to-node entry. For example, referring to FIG. 8, it is a block diagram illustrating a sub-chunk-to-node mapping for redundantly hosted sub-chunks in a multi-node database cluster. In the embodiment illustrated in FIG. 8, each entry in the sub-chunk-to-node mapping has information similar to the entries illustrated in the sub-chunk-to-node mappings of FIG. 4. However, unlike the sub-chunk-to-node mappings illustrated in FIG. 4, in FIG. 8 every sub-chunk has two entries in the sub-chunk-to-node mappings, where each entry for the sub-chunk corresponds to a different host-node of the sub-chunk. For example, among the mappings maintained by node 102, entry 802 maps the sub-chunk associated with the disk block range 334 to 336 to node 102, while entry 804 maps the same sub-chunk to node 112.

According to one embodiment, the sub-chunk-to-node mappings maintained by each node are divided into mapping groups that correspond to the IMC sets. Specifically, as illustrated in FIG. 8, mapping group 820 includes entries in which all sub-chunks are mapped to the IMCs in IMC set 700, and mapping group 822 includes entries in which those same sub-chunks are mapped to the IMCs in IMC set 702.

How mapping groups are used in the assignment and distribution of work granules shall be described in detail hereafter.

Distributing Work Granules when a Chunk has Multiple Hosts

When choosing how to separate and distribute work granules during query execution, the parallel query coordinator chooses a particular mapping group, and then distributes work granules to the database server instances based on the mappings specified for that mapping group. For example, assume database server instance 106 receives a query and assumes the role of parallel query coordinator for the query. The parallel query coordinator may select mapping group 820 as the basis for distributing the work for the query. Thus, work that targets chunks 302, 304 and 306 will be handled by nodes 102, 112 and 122, respectively, using the IMCs in IMC set 700.

On the other hand, if mapping group 822 is selected, the mappings associated with mapping group 822 will be used as the basis for distributing the work of the query. Under these circumstances, work that targets chunks 302, 304 and 306 will be handled by nodes 112, 122 and 102, respectively, using the IMCs in IMC set 702.

After the work is finished by the various parallel query slaves 106, 116, 126, the results are sent back to the parallel query coordinator 106. The parallel query coordinator 106 then performs any necessary further processing on the data, and sends a response to the application that submitted the query.

Node Failure in a Multiple-Hosts-Per-Chunk System

When a node fails in a single-hosts-per-chunk system, the chunks stored in the failed node's volatile memory cease to be available for query processing. The chunk may be re-hosted elsewhere, as described above, but in the meantime, query execution would normally require accessing some data from disk. However, leveraging redundant chunk hosting, the work granules that target a particular chunk, which may otherwise have been sent to the failed node, are sent instead to another host node for the particular chunk.

Figure 9:
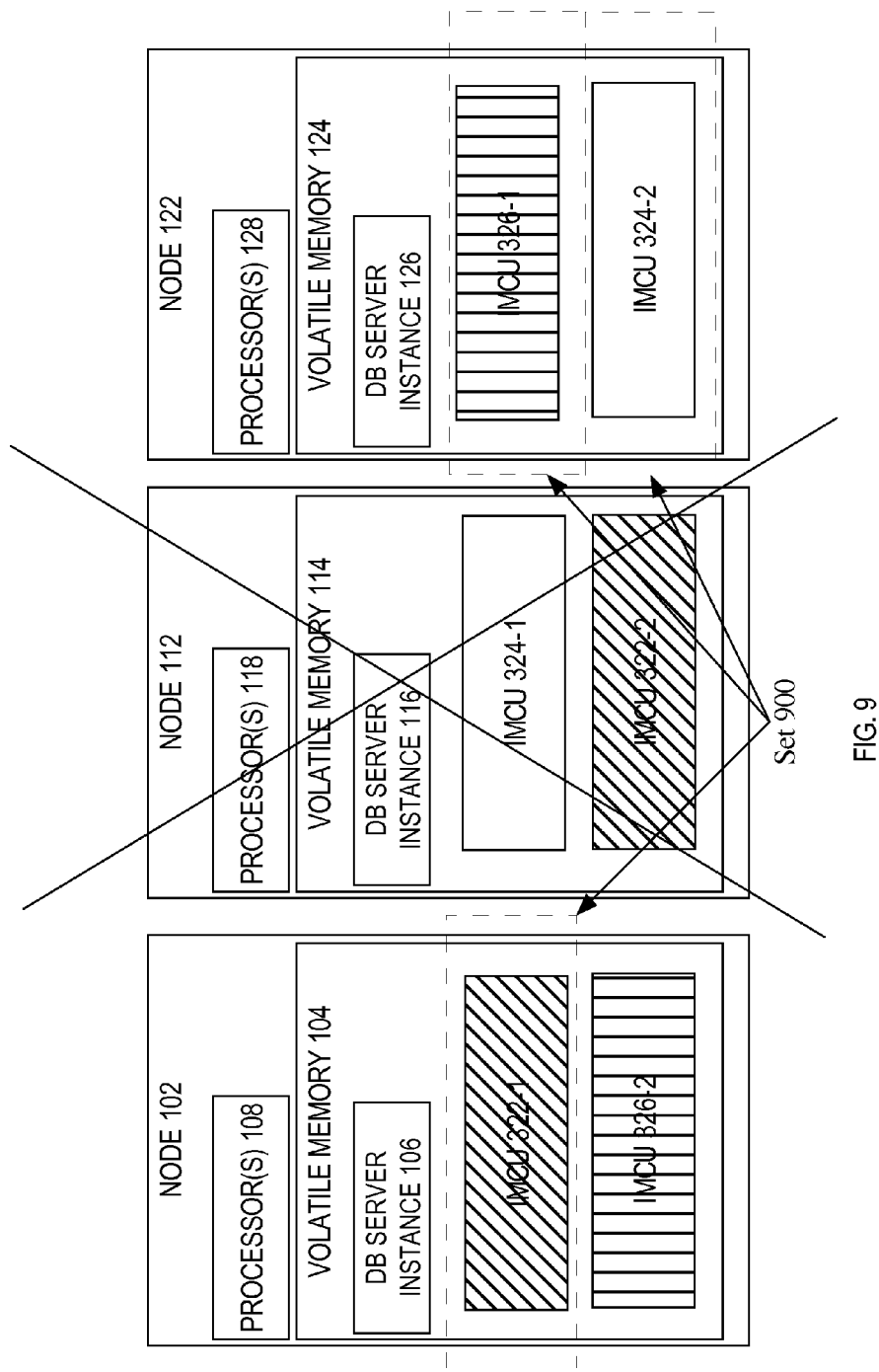
FIG. 9 is a block diagram illustrating redundantly hosted chunks in a multi-node database cluster after a node failure.

FIG. 9 is a block diagram illustrating how nodes are chosen for performing the work granules of a query after a node has failed. For the purpose of explanation, it shall be assumed that IMC set 700 has been designated the "primary IMC set" for processing the query, while IMC set 702 has been designated the "secondary IMC set" for processing the query.

After receiving a query, the parallel query coordinator 106 distributes all work granules based on the sub-chunk-to-node mappings reflected in the mapping group 820 that corresponds to the primary IMC set 700, except for those work granules that, based on sub-chunk-to-node mappings of mapping group 820, would be distributed to the failed node 112. The work granules that, based on sub-chunk-to-node mappings of the mapping group 820, would be distributed to the failed node 112 are instead distributed based on the sub-chunk-to-node mappings reflected in the secondary Mapping group 822, which corresponds to the secondary IMC set 702.

In the present example, based on primary mapping group 820, work for the sub-chunks beginning at addresses 330 and 334 would be assigned to node 102, and work for the sub-chunks beginning at addresses 342 and 346 would be assigned to node 122. On the other hand, based on mapping group 822, work for the sub-chunks beginning at 336 and 340 would be assigned to node 122. Based on these assignments, the work for the query is performed by IMCs 900, which are IMCs that reside on working nodes. The final in-parallel query execution includes:

Database server instance 106 receiving granules that are generated to perform work on sub-chunks located in IMC 322-1, and Database server instance 126 receiving granules that are generated to perform work on sub-chunks located in IMC 324-2 and IMC 326-1.

Node failure may occur after work for a query has already been distributed across the cluster. Whenever a node dies in the process of performing work on its own workload, the parallel query coordinator receives a message of the failure, and then restarts the query from scratch. At this time, the query coordinator makes use of both a primary and a secondary IMC set as described above. For example, work granules may be distributed to database server instances 106, 116, 126 on their respective nodes 102, 112, 122 to perform work against IMC 322-1, 324-1, and 326-1 respectively. If node 112 fails while executing its own work granule against IMC 324-1. The parallel query coordinator would receive a message regarding the failure, and restart execution of the query from scratch. The parallel query coordinator creates a new query execution plan leveraging the set of IMCs 900. The parallel query coordinator distributes work granules for performing work against IMC 322-1 to database server instance 106 on node 102, and work granules to perform against IMC 324-2 and IMC 326-1 to database server instance 126 on node 122.

Alternatively, rather than re-executing the entire query from scratch, the parallel query coordinator may identify the chunks residing on the failed node by scanning the chunk-to-node mapping. Then, the work granules created to execute against those chunks are resent to a different node based on the chunk-to-node mapping of the identified chunk in the secondary set of IMCs.

Executing Two Queries Concurrently

When a chunk is hosted by more than one node, each host node for the chunk can execute a query that accesses that chunk in parallel with another host node that is executing a query that accesses that chunk. Under these circumstances, each host node will access its own local IMC for the chunk.

When two nodes are executing queries against copies of the same IMC, shared locks may be granted over the data contained in the IMCs. Further, coordination between the nodes is not necessary when both queries are read-only. However, when one or more of the queries that are executing in parallel require DML operations to be performed on data contained in the IMC, before either node performs an update:

the node performing the update acquires an exclusive lock that covers the data that is to be updated the nodes that are not performing the update lose their shared locks on the data, and invalidate the portion of their IMC that corresponds to that data Additional details about how parallel DML operations are handled in multiple-hosts-per-chunk system are provided in U.S. Provisional Patent Application No. 62/168,692, which is incorporated herein by this reference.

In one embodiment, when determining how to distribute work granules for a first query, the parallel query coordinator distributes work granules based on the mappings of one mapping group 820. Then, when another query is received that requires work on the same chunk, parallel query coordinator distributes work granules based on mappings of another mapping group 822. Since different mapping groups map the same chunk to different host nodes, switching the mapping groups from query to query causes the work associated with a particular chunk to be distributed among the various host nodes of the chunk.

Parallelism in NUMA Systems

Figure 10:
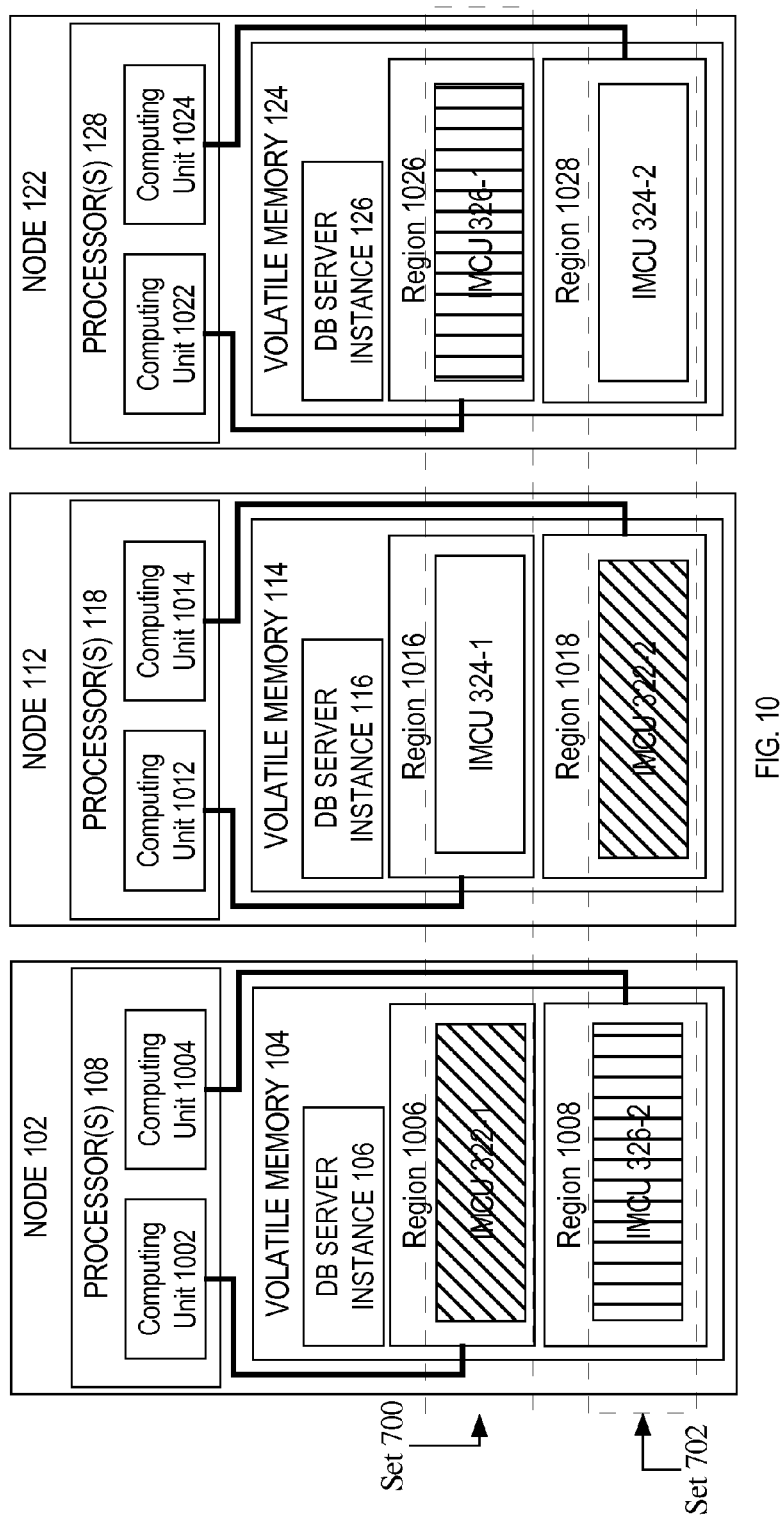
FIG. 10 is a block diagram illustrating redundantly hosted chunks in different regions of volatile memories on a NUMA system in a multi-node database cluster.

As illustrated in FIG. 7, a single node may host multiple IMCs. For example, node 102 hosts IMCs 322-1 and 326-2. In a NUMA system, the IMCs hosted by a single node may reside in regions of volatile memory that correspond to different computing units. For example, as illustrated in FIG. 10, IMC 322-1 resides in a region 1006 of volatile memory 104, and IMC 326-2 resides in a different region 1008 of volatile memory 104. In redundantly hosted systems, the IMCs within the single node can belong to different IMC sets. For example, as illustrated in FIG. 10, IMC 322-1 belongs to set 700 and IMC 326-2 belongs to set 702.

After receiving two queries that require work against the same set of data, the parallel query coordinator(s) creates work granules for the first query based on the first mapping group 820 and creates work granules for the second query based on the second mapping group 822. When receiving work granules for the two separate queries that require work against the same segment of data, a single node may perform the work designated by the work granules in parallel, on two separate computing units. Because a different mapping group is used for each work granule, in-parallel query execution happens at both the cluster level and the node level. For example, referring to FIG. 10, after sending out work granules for two queries based on the mapping groups in FIG. 8:

For the first query, database server instance 106 performs work against data residing in IMC 322-1 using NUMA1 (computing unit 1002 with high speed access to region 1006), while performing work against data residing in IMC 326-2 using NUMA4 (computing unit 1004 with high speed access to region 1008) for the second query;

For the first query, database server instance 116 performs work against data residing in IMC 324-1 using NUMA2 (computing unit 1012 with high speed access to region 1016), while performing work against data residing in IMC 322-2 using NUMA5 (computing unit 1014 with high speed access to region 1018) for the second query; and For the first query, database server instance 126 performing work against data residing in IMC 326-1 using NUMA3 (computing unit 1022 with high speed access to region 1026), while performing work against data residing in IMC 324-2 using NUMA6 (computing unit 1024 with high speed access to region 1028) for the second query.

Partitioning Schemes

Typically, the data stored in a relational table is not ordered. Therefore, when a user submits a query that selects all rows from a table that satisfy particular filter criteria, the entire table has to be scanned to ensure that no rows that satisfy the filter criteria are missed. However, if the table is partitioned using partitioning criteria that correspond to the filter criteria, then the parallel query coordinator may avoid the need to scan the entire table. For example, if a table T1 is partitioned using range-based partitioning on column c1, and the filter criteria is c1=5, then only the partition of T1 that corresponds to the range into which 5 falls needs to be scanned. The other partitions of T1 cannot possibly have rows that satisfy the filter criteria c1=5. The method of how a table is partitioned may be referred to the "partitioning scheme" of the table.

With partitioning, a table is divided into sub-tables, referred to as partitions. When a database server stores a row in a partitioned table, the database server determines the partition for the row based on (1) one or more values in the row, and (2) the partitioning criteria associated with each of the table's partitions.

In some cases, the partitioning criteria involve a single column. For example, the partitions P1, P2 and P3 of a table T may respectively correspond to ranges 0-100, 101-200 and 201-300 for column c1. In the case where a table is partitioned based on values in a particular column, the particular column is referred to as a partition key. Different partition criteria may be used on the same partition key to create distinct partition groups.

The example above involves range partitioning. However, there are multiple types of partitioning. For example, partitioning types include, but are not limited to, range partitioning, list partitioning, or hash partitioning. In "range" partitioning, a table is divided up so that each individual partition corresponds to a particular range of values based on the partition column. For example, a "DATES" column in a table may be used as a partition key to partition rows into "QUARTERS" of the year. In a list partitioning, a table is divided up so that each individual partition has a particular list of values. For example, data in a "DEPARTMENT" column in a table may be limited to one of five different departments. A different partition may be created for each department. In hash partitioning, a hash function is applied to each value in a column to distribute rows into a selected number of groups. For example, a table of product sales may have five thousand rows, but a "PRODUCT ID" column that only distinguishes between three hundred different products. By applying a hash function to the values in the PRODUCT ID column, the five thousand rows may be separated into four partitions by grouping rows into a partition with the same groups of products. Rather than requiring a user to select the groups of product, the hash function naturally chooses groups based on the values in the PRODUCT ID column. In this example, the five thousand rows are still separated into four partitions. All of these examples describe different partitioning schemes based on a selected partitioning type and a selected column for the partition key.

Assigning Partitions to Nodes Instead of Assigning Chunks to Nodes

In some embodiments, to leverage the benefits provided by partitioning a table, the load operation master for a partitioned table may make host node assignments on a partition-by-partition basis, rather than making host node assignments on a chunk-by-chunk basis. For example, referring to FIG. 2, assume table 170 is a partitioned table and segments S1, S2, and S3 belong to individual partitions P1, P2, P3, respectively. When data from this table is distributed across cluster 100, Data from the extents in segment S1 corresponding to partition P1 are divided into chunks and loaded into volatile memory 104
  Data from the extents (not shown) in segment S2 corresponding to partition P2 are divided into chunks and loaded into volatile memory 114
  Data from the extents (not shown) in segment S3 corresponding to partition P3 are divided into chunks and loaded into the volatile memory 124

Continuing the example into the left side of FIG. 3A, the chunks 302, 304 and 306 are still created as shown, but they are assigned to node 102 because they are part of P1. Thus, the corresponding IMCs 322, 324, 326 for chunks 302, 304, 306 would be hosted by the same host node 102. In a similar manner, the chunks created for partition P2 would be mapped to host node 112 and pre-loaded into the volatile memory of host node 112, and the chunks created for partition P3 would be mapped to host node 122 and pre-loaded into IMCs for host node 122.

FIG. 3C illustrates a chunk-to-node mapping for chunks from a partitioned table. Chunks are assigned to host nodes according to the partition to which they belong. Thus, chunks 302, 304, 306 are all mapped into node 102 because they all belong to segment S1 corresponding to partition P1; chunks 308, 310, 312 are all mapped to node 112 because they all belong to segment S2 corresponding to partition P2; and chunks 314, 316, 318 are all mapped to node 122 because they all belong to segment S3 corresponding to partition P3.

Determining Corresponding Partitions

When determining how to assign data from multiple partitioned tables to host nodes, it is desirable to assign to the same host node the partitions, for different tables, that have similar partitioning criteria. Thus, if a table T1 has a partition T1P1 whose partitioning criterion is "DATE in the range X", and a table T2 has a partition T2P1 whose partitioning criterion is also "DATE in the range X", then T1P1 and T2P1 should be assigned to the same host node.

As another example, a database may have a "fact table" object and multiple "dimension table" objects. The fact table has a large number of rows with multiple columns for each row, while the dimension tables may comprise only a few columns. The fact table and dimension tables are likely organized so one or more of their columns are similar. For example, one dimension table may have a DEPARTMENT column in common with the fact table, while another dimension table may have a DATES column in common with the fact table. Both the fact table and the dimension tables may be partitioned along one or more of these similar columns. The partitions of each table may correspond to each other. Partition X of table 1 "corresponds to" partition Y of table 2 if partition X has the same partition criteria as partition Y.

Figure 11A:
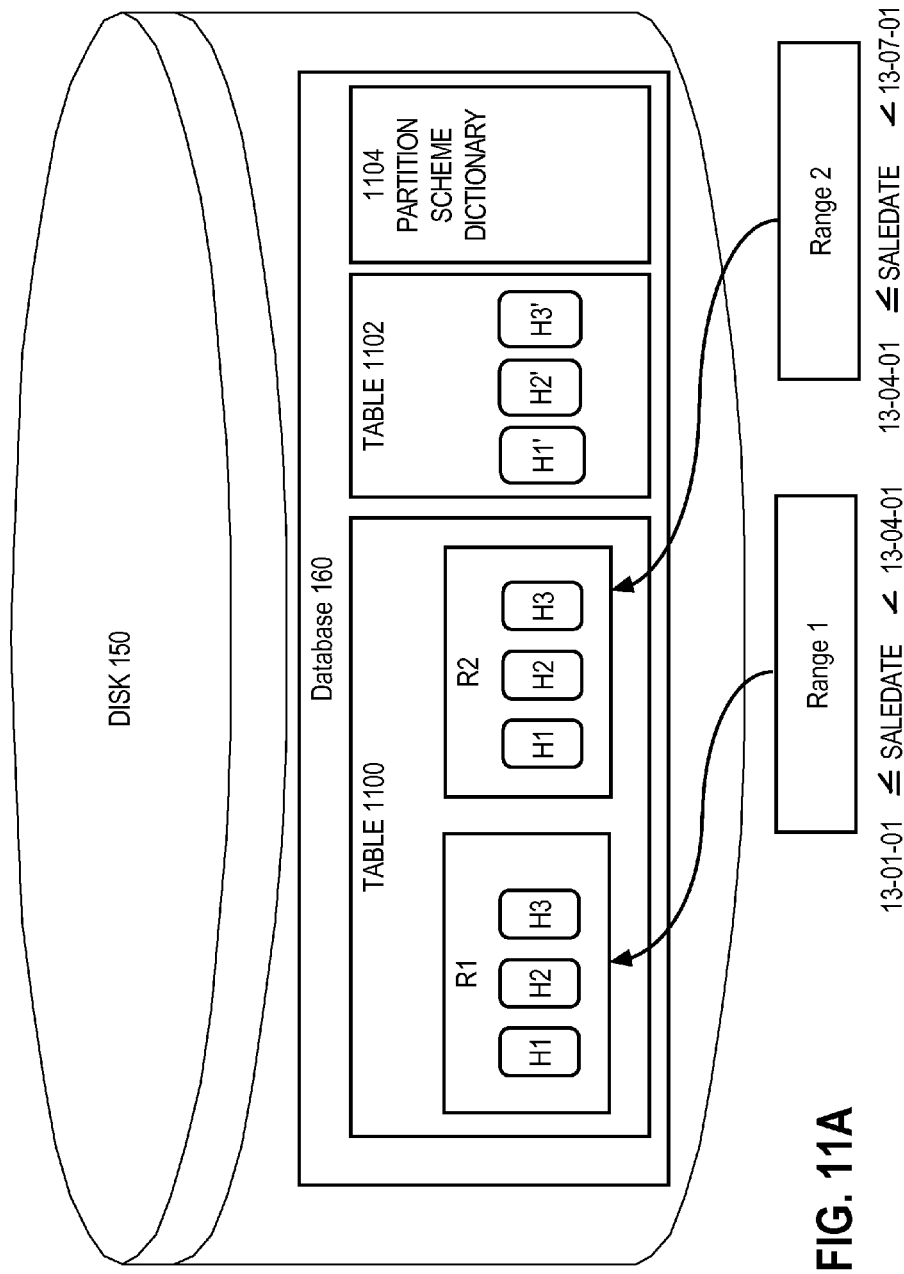
FIG. 11A is a block diagram illustrating a composite partitioned table and a table with a partitioning scheme in common.

FIG. 11A is a block diagram illustrating how two tables with a partitioning scheme in common are partitioned on disk 150. Table 1100 may be consider a fact table, while table 1102 may be consider a dimension table. The tables 1100, 1102 have a hash partitioning scheme in common.

The partitions for H1 in table 1100 correspond to the partition H1' in table 1102 because they are hash partitioned according to same partition criteria.
  The partitions for H2 in table 1100 correspond to the partition H2' in table 1102 because they are hash partitioned according to same partition criteria.
  The partitions for H3 in table 1100 correspond to the partition H3' in table 1102 because they are hash partitioned according to same partition criteria.

Each partition in a table corresponds to a distinct set of one or more hash values referred to as the partition criterion for that partition within the hash partition scheme. The partition criterion for H1 requires that the hash values are all equal to a single value, group of values, or a range of values. The partition criterion for H2 requires that the hash values are equal to a different single value, group of values, or range of values. The partition criterion for H3 requires that the hash values are equal to another different single value, group of values, or range of values.

The database 160 may maintain a dictionary of partitioning schemes 1104 that stores a particular partitioning scheme ID for each partitioning scheme and stores the names of tables using those partitioning schemes. Using this dictionary of partitioning schemes 1104, any load operation master attempting to determine how to distribute a partitioned table 1100 or 1102 is aware of common partitioning schemes among multiple tables. The load operation master may use the common partitioning schemes to derive the corresponding partitions. For example, the load operation master for table 1100 in FIG. 11A would not choose to distribute by the range partition because no other partitioned tables in the database have a similar range partitioning scheme recorded in partition scheme dictionary 1104.

Composite Partitioning

A technique, referred to herein as composite partitioning, involves creating partitions of partitions. For example, a table may be partitioned using a ranged based partitioning scheme to create a set of first-level partitions. A hash function may then be applied to each of the first-level partitions to create, for each first level partition, set of second level partitions. Further, the partitioning key used to create the partitions at one level may be different than the partitioning key used to create the partitions at other levels. Examples of composite partitioned tables include, but are not limited to, range-hash, range-range, and hash-hash. Other examples include three or more levels of partitioning such as range-range-hash. In the case of a composite partitioned table, a sub-partition may refer to a partition of a partition.

Organizing Partitions Into Partitioning Scheme Dimensions

Partitions may be grouped according to a partition criterion from any partitioning scheme in a composite partitioned table. For example, table 1100 is range-hash partitioned with partition criteria for two ranges R1, R2 and partition criteria for three hashes H1, H2, H3. The table is divided into six partitions total R1H1, R1H2, R1H3, R2H1, R2H2, and R2H3. The data from the partitioned table may be grouped according to partition criteria for R1 and R2 or according to partition criteria for H1, H2, and H3.

Figure 11B:
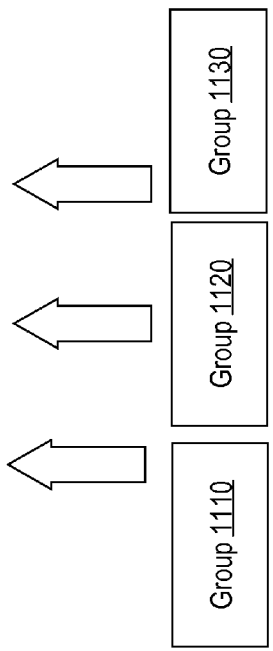
FIG. 11B is a block diagram illustrating how partitions from two tables with a partitioning scheme in common are grouped.

The partitions of a composite partitioned table may be placed in a matrix with n dimensions, where n is the number of partitioning schemes for that table. The partitions may then grouped based on any dimension. FIG. 11B illustrates how the partitions of two tables with a partitioning scheme in common may be organized in a matrix, so different groupings may be considered. The partitions of each table are organized in a matrix with a hash dimension and a range dimension. Using the two dimensional matrix, the partitions may be grouped in two ways, horizontally or vertically. Table 1102 and table 1100 have only one dimension in common (the same hash partitioning scheme), so the partitions are grouped vertically by the hash dimension. All of the partitions with an H1 partition criterion are in a group 1110, all of the partitions with an H2 partition criterion are in a group 1120, and all of the partitions with an H3 partition criterion are in a group 1130.

Partition-To-Node Mapping

Partitions are grouped so the load operation master may communicate the grouping to the database server instances for loading. A partition belonging to a particular group is said to have a "partition affinity." The load-operation master may transfer partition affinity information along with the consistency information previously described, such as the target segment metadata (e.g. start address and size of the extents of the target segment), "snapshot information", a list of the database server instances that have been assigned chunks, and "chunk size information." Each host node may divide each partition into chunks as previously described, and the chunks are compressed and loaded into IMCs. The assignments of chunks are made such that chunks that belong to the same partition tend to be assigned to the same node.

According to one embodiment, the same algorithm is independently used by all database server instances to determine which nodes shall host each group of partitions. For example, in one embodiment, a node is assigned to host all of the chunks for a given partition by applying a hash function, such as a rendezvous hash, to N hash key values, where each of the hash key values corresponds to a distinct node. The hash key value for a node may be a unique identifier associated with a partition's position in a particular dimension concatenated to a unique identifier for the node. Applying these N hash key values to the hash function will produce N hash values, each of which correspond to a node. The node associated with the highest hash value is then selected as the host node for the partition.

The node assigned to each partition is stored in a partition-to-node mapping. For example, referring to FIG. 11C, in table 1100 the partitions R1H1 and R2H1 are both first partitions in the hash scheme dimension, and in table 1102, the partition H1' is the first partition in the hash scheme dimension. Using the same hash key for all three partitions results in the first partitions (H1's) being consistently mapped to node 102, the second partitions (H2's) being consistently mapped to node 112, and the third partitions (H3's) being consistently mapped to node 122 in mappings 1112, 1122, 1132, 1114, 1124, 1134.

In some embodiments, the partitions may be loaded in parallel according to a partition-to-node mapping rather than a chunk-to-node mapping. FIG. 10C illustrates how two tables with a partitioning scheme in common may be loaded, in parallel, so corresponding partitions are sent to the same volatile memories in a multi-node cluster.

- Database server instance 106 loads group 1110 (R1H1, R2H1, H1') into local volatile memory 104 of host node 102;
- Database server instance 116 loads group 1120 (R1H2, R2H2, H2') into local volatile memory 114 of host node 112; and
- Database server instance 126 loads group 1130 (R1H3, R2H3, H3') into local volatile memory 124 of host node 122.

Multiple Load Operation Masters

Two separate load-operation masters may determine how to distribute table 1100 and table 1102 to the nodes 102, 112, and 122 independently. For example, if table 1100 is locked by load operation master (i.e. database server instance 106), and table 1102 is locked by another load operation master (i.e. database server instance 116), the data from the tables is still loaded consistently according to the mappings 1112, 1122, 1132, 1114, 1124, 1134 in FIG. 11C. Each load-operation master (database server instances 106 and 116) accesses the same dictionary of partitioning schemes and generates the same matrix to determine how to load data for each table 1100, 1102. Without actually communicating with each other, each load operation master groups partitions with similar partition criteria and maps them to the same nodes.

Partition-Affinity-Aware Distribution

According to one embodiment, data from a partitioned table is mapped to host nodes based on how data from another partitioned table has already been mapped to host nodes. For example, assume database server instance 106 has a load-master lock on table 1102 and communicates partition affinities for table 1102 before database server instance 116 obtains a load-master lock on table 1100. After load operation master (i.e. database server instance 106) assigns the partitions of table 1102 according to the hash partitioning scheme, an indication of this mapping is sent to each node 102, 112, 122, so each node 102, 112, 122 has the same mappings 1114, 1124, 1134. The partition H1' is mapped to node 102; the partition H2' is mapped to node 112; and the partition H3' is mapped to node 122. The load-master lock is downgraded to a shared lock, so each node may autonomously load their assigned partitions according to the mapping.

The next load operation master (i.e. database server instance 116) scans its own existing mapping 1124 before organizing table 1100 into partition groups. After scanning the mapping 1124, the load operation master 116 determines that:

Node 102 has a pre-existing affinity for data from partitions with H1 partition criterion Node 112 has a pre-existing affinity for data from partitions with H2 partition criterion Node 122 has a pre-existing affinity for data from partitions with H3 partition criterion Because table 1100 has the same partitioning scheme, the next load operation master (i.e. database server instance 116) assigns:

Data from partitions R1H1 and R2H1 to group 1110;

Data from partitions R1H2 and R2H2 to group 1120; and

Data from partitions R1H3 and R2H3 to group 1130.

After the next load operation maters (i.e. database server instance 116) downgrades its load—master lock and sends an indication of these partition affinities, the database server instances 106, 116, 126 may then independently create mappings 1112, 1122, 1132, and independently load data from table 1100 according to the mappings 1112, 1122, 1132.

Additional Factors in Determining a Dimension to Distribute By

Two or more partitioned tables may contain multiple common partitioning schemes that are likely to be combined in a join operation. Some embodiments may require choosing one partition scheme among multiple common partitions schemes when grouping data from partitions with the same partition criterion for pre-loading. In a first example, two or more tables that are likely to be pre-loaded may have composite partitioning schemes with two or more partitioning schemes in common. This scenario is presented in tables 1100 and 1103 in FIG. 13.

In a second example, a first table such as a fact table may have multiple partitioning schemes; a second table such as a dimension table may have one partitioning scheme in common with the first table, and then a third table such as a different dimension table may have a different partition scheme in common with the first table. This scenario would exist in FIGS. 11A-11C if another dimension table (not shown) was likely to be distributed across the volatile memories of the database cluster, and the other table (not shown) was partitioned into two range partitions R1', R2' according to the same range partitioning scheme as table 1100. Under either scenario, a node in the cluster determines which of the partitioning schemes in table 1100 should be used to group the partitions for mapping to each node.

In some embodiments, a primary step for determining which partitioning scheme should be used to group partitions includes determining common hash partitioning schemes between two or more tables. In some embodiments, a primary or secondary step for determining which partition scheme should be used to group partitions includes determining the highest cardinality dimension among common partitioning schemes. The combination of the two steps, determining the highest cardinality hash partitioning scheme, may be important when there are more than two hash partitioning schemes in common among two or more tables. Further determinations may be used to predetermine partition schemes that use columns from two or more tables that are the same columns likely to be used in a join operation.

Using these determinations as factors in determining which partitioning scheme should be used to group partitions takes into account multiple performance optimizations. First, the partition key used for the hash partitioning is frequently used as the column linking two tables in join queries. Second, hash partitions tend to more evenly distribute data than range partitions or list partitions. Thus, during query execution, work performed against data from a table distributed by hash partition may be more evenly distributed across the cluster. Third, distributing along the highest cardinality partitioning scheme results in partition groupings distributed among a larger number of host nodes. Thus, during query execution, work performed against data from a table distributed by the highest cardinality partitioning scheme is distributed to the maximum amount nodes possible. Fourth, having tables separated into a large number of groupings provides for a scalable multi-node cluster. For example, a two node cluster may be improved by adding a third node because partitions corresponding to a third partition criteria may be pre-loaded into the new node.

Even when a second partitioned table has not been selected for pre-loading across the volatile memories of a multi-node database cluster, these determinations may be used to load a first table. When a second table eventually is loaded into volatile memory (either for pre-loading purposes or for performing a join operation in response to a query), the performance of the cluster benefits from the initial grouping determinations made during pre-loading of the first table.

Figure 12A:
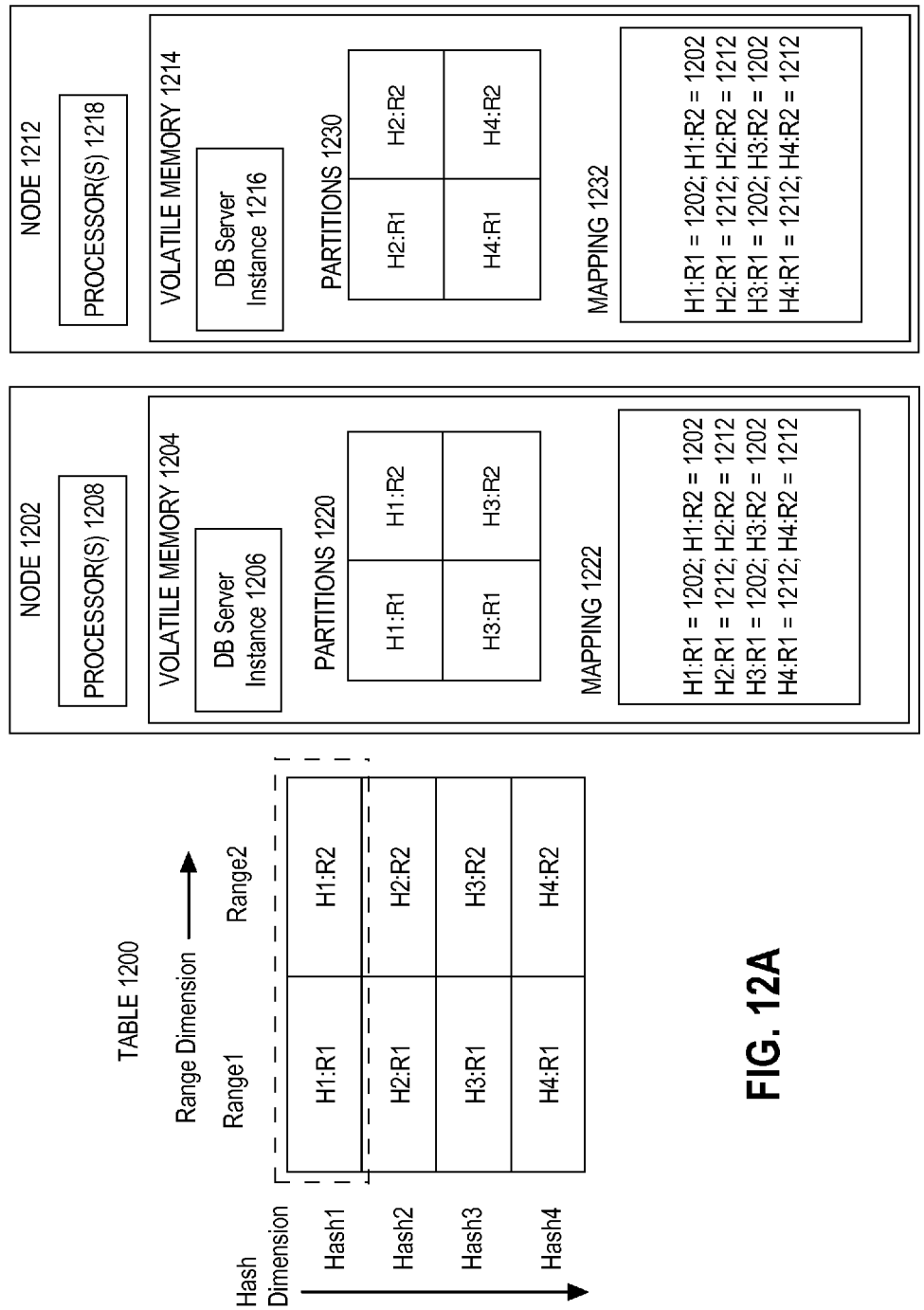
FIG. 12A is a block diagram illustrating how a database server instance chooses between two partitioning schemes to distribute across volatile memory of a multi-node cluster.
Figure 12B:
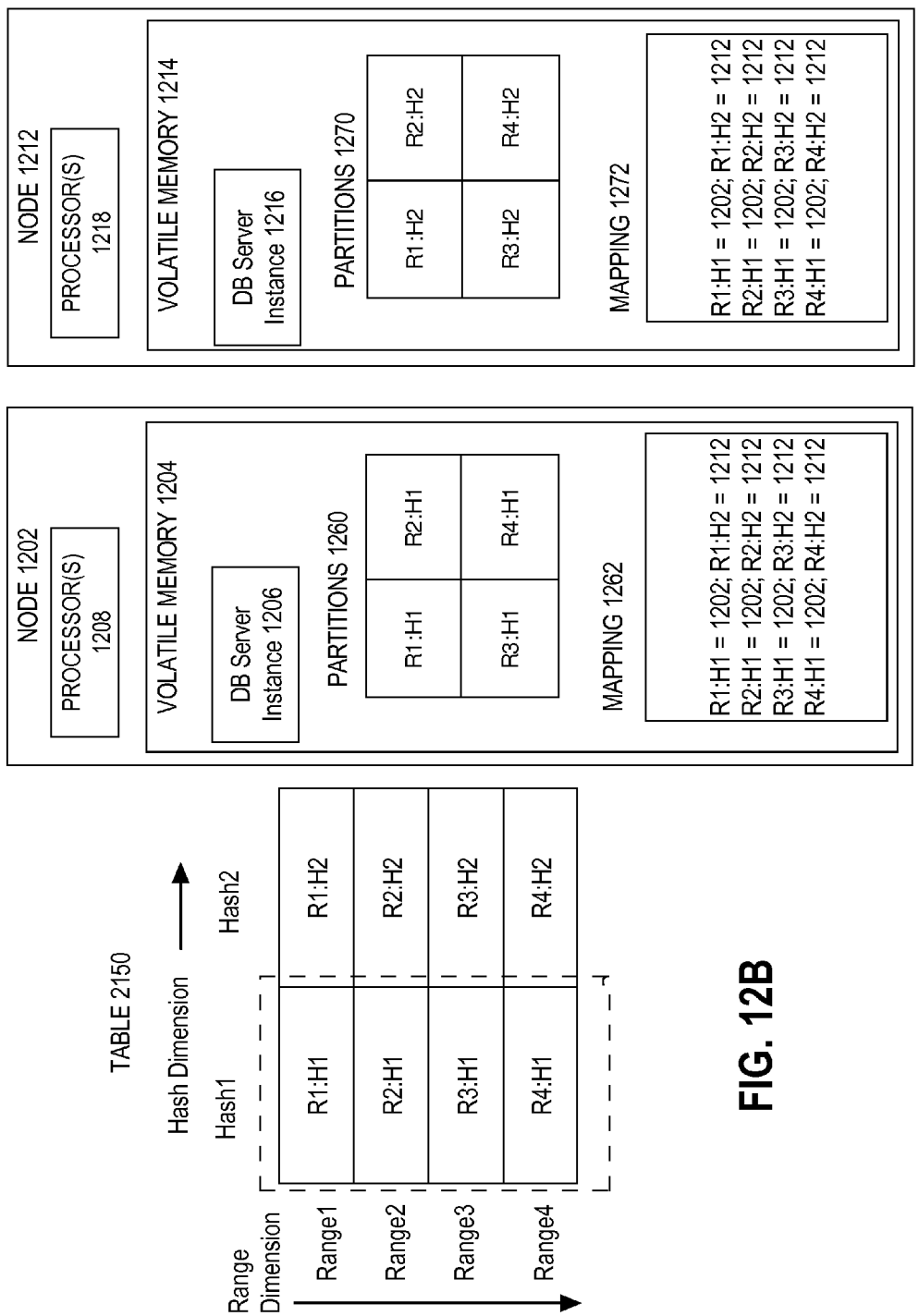
FIG. 12B is a block diagram illustrating how a database server instance chooses between two partitioning schemes to distribute across volatile memory of a multi-node cluster.

FIGS. 12A and 12B are block diagrams illustrating how to distribute data from two composite partitioned tables by the hash partitioning scheme. In FIG. 12A, a table 1200 is hash partitioned into four partitions first and then sub-partitioned by range into two partitions for each hash partition. Table 1200 is organized into a matrix by partition criteria and distributed across the two node cluster 1202, 1212 based on the hash partition dimension. After a partition-to-node mapping 1222, 1232 of the partitions is independently created by each database server instance 1206, 1216, partitions from group 1220 corresponding to partition criteria for H1 and H3 are mapped to node 1202, and partitions from group 1230 corresponding to partition criteria for H2 and H4 are mapped to node 1212.

In FIG. 12B, a table 1250 is range partitioned into four groups first and then sub-partitioned into two hash partitions for each range partition. Table 1250 is organized into a matrix by partition criteria and distributed across the two node cluster 1202, 1212 based on the hash partition dimension. After a partition-to-node mappings 1262, 1272 are independently created by each database server instance 1206, 1216, partition group 1260 corresponding to partition criterion for H1 is mapped to node 1202, and partition group 1270 corresponding to partition criterion for H2 is mapped to node 1212.

In some embodiments, distribution may occur according to the highest cardinality dimension without regard to partitioning type to take full advantage of a large number of available nodes. For example, if FIG. 12B had three nodes, thereby exceeding the two partition cardinality of the hash partition dimension in table 1250, it could be desirable to distribute based on the range partitioning scheme dimension, which has a higher cardinality of four.

Executing Join Queries Against In-Memory Copies of Partitioned Data

Upon receiving a query, the parallel query coordinator divides the query into work granules based on the in-memory location of data in the multi-node database cluster 100. Because of the distribution of partitions along a particular partitioning scheme, the parallel query coordinator, aware of the partitioning scheme, may create a query execution plan where condition evaluation for certain queries is performed in-parallel by each database server instance.

Figure 11C:
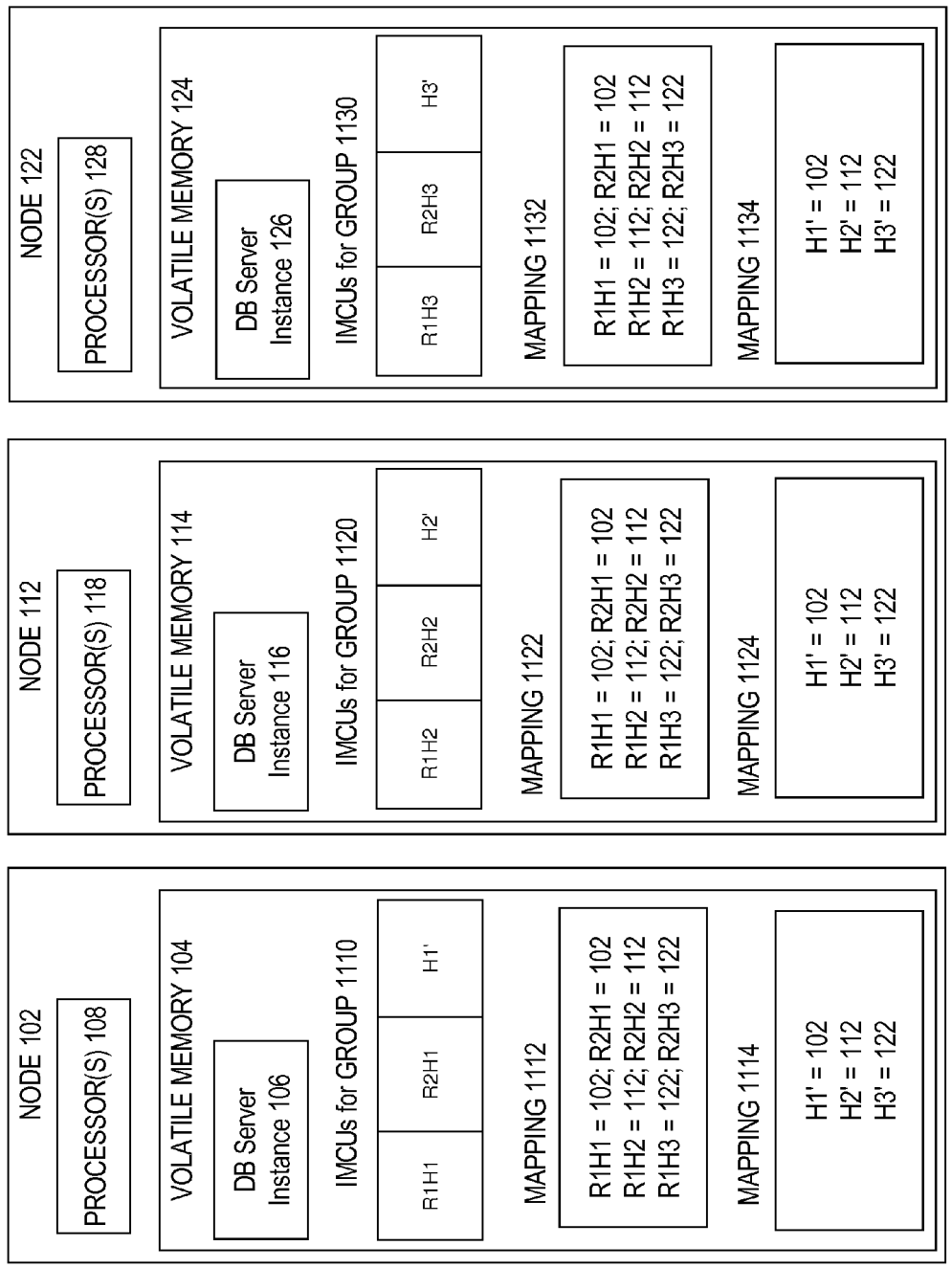
FIG. 11C is a block diagram illustrating how two tables with a partitioning scheme in common are distributed across volatile memory of a multi-node cluster.

For example, referring to FIGS. 11A-11C, if a manager wants to review sales by department, a query to a sales database may be executed as follows:
SELECT*FROM table1100, table1102 WHERE table1100.C2=table1102.C1';

Table 1100 may represent sales data for the year with columns for date-of-sale (C1), PRODUCT ID (C2) and sale price (C3). Table 1102 to may represent products by department with columns for PRODUCT ID (C1') and department number (C2').

The two tables 1100, 1102 in this query are linked by the PRODUCT ID column, which is referred to herein as the "join key". Assuming the join key and the partition key of the distributed hash partitioning scheme dimension from FIG. 11C are on the same columns, the parallel query coordinator may create a query execution plan where the work for the condition table1000.C2=table1102.C1' is performed in parallel by each database server instance 106, 116, 126. In the present example, the messages sent by the parallel query coordinator would distributed the work as follows:

For database server instance 106:
SELECT*FROM R1H1, H1' WHERE R1H1.C2=H1'.C1';
SELECT*FROM R2H1, H1' WHERE R2H1.C2=H1'.C1';

For database server instance 116:
SELECT*FROM R1H2, H2' WHERE R1H2.C2=H2'.C1';
SELECT*FROM R2H2, H2' WHERE R2H2.C2=H2'.C1';

For database server instance 126:
SELECT*FROM R1H3, H3' WHERE R1H3.C2=H3'.C1';
SELECT*FROM R2H3, H3' WHERE R2H3.C2=H3'.C1';

When the join key of a query and the partition key of the distributed partitioning scheme are the same columns, the corresponding partitions required to evaluate the join condition are hosted by the same nodes. Because the work required to evaluate the join condition may be performed without requesting data from disk, the rows satisfying the join condition are determined by each database server instance in parallel, and only the rows meeting the join condition are returned to the parallel query coordinator.

In the previous example, the partition key for the hash partitioning scheme of tables 1100, 1102 was the "PRODUCT ID" column. After referring to its own mappings 1112, 1114, the parallel query coordinator 106 for this query determined the join key was on the same column as the partition key of the hash partitioning scheme (PRODUCT_ID). The parallel query coordinator made work granules for each database server instance according to the partitions hosted by each node.

The parallel query coordinator communicated these work granules to their respective database instances on their respective nodes along with a time-stamp of the original query. In order to evaluate the work granules, each database server accessed its own local volatile memory without accessing the volatile memory of any other database server instance.

Tables Joined by a Different Column than the Distributed Dimension

If the join key of a query and the partition key of the distributed partitioning scheme are not the same columns, work granules are created to maximize the number of nodes performing work in parallel rather than transferring partitions between nodes. The work performed by each database server instance includes aggregating in-memory data back to the parallel query coordinator rather than evaluating conditions against data located in another node's volatile memory. This approach takes full advantage of the number of nodes employed by the cluster, rather than lowering the number of nodes working in parallel to perform an in-parallel partition-wise join.

Figure 13:
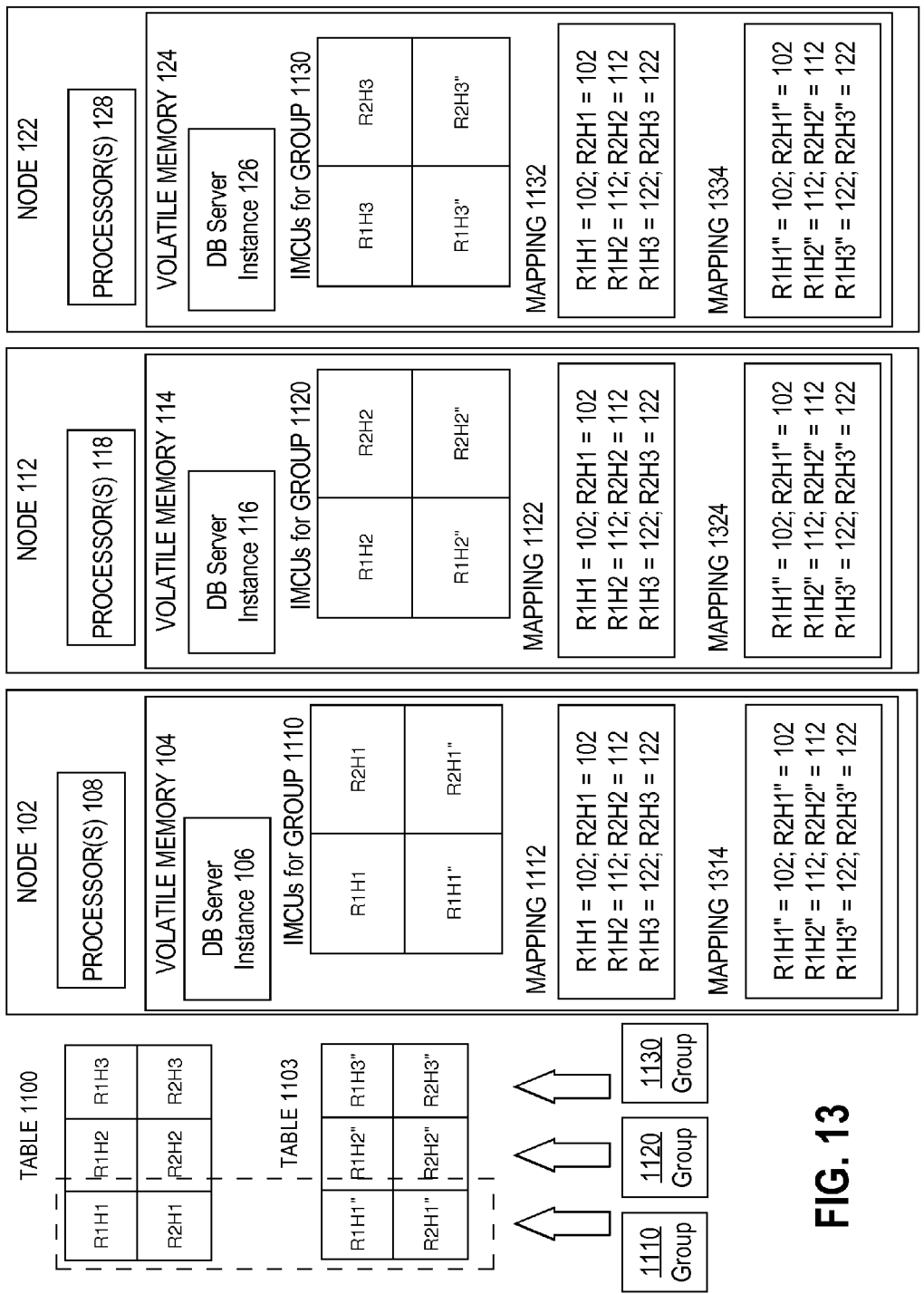
FIG. 13 is a block diagram illustrating how a database server instance chooses between two partitioning schemes from two composite partitioned tables to distribute across volatile memory of a multi-node cluster.

FIG. 13 is a block diagram illustrating how two tables with two partitioning schemes in common are distributed across volatile memory of a multi-node cluster. Table 1100 is the fact table from FIGS. 11A, 11B, and 11C and a new table 1103 is a dimension table with a date column, similar to fact table 1100. This new table 1103 is range-hash partitioned according to the same partitioning schemes as table 1100, and the partitions R1H1", R2H1", R1H2", R2H2", R1H3", R2H3" are grouped and distributed according to the hash partitioning scheme just like table 1100:

Database server instance 106 creates each mapping 1112, 1314 and loads group 1110 (R1H1, R2H1, R1H1", R2H1") in the volatile memory 104 of host node 102;

Database server instance 116 creates each mapping 1122, 1324 and loads group 1120 (R1H2, R2H2, R1H2", R2H2") in the volatile memory 114 of host node 112; and Database server instance 126 creates each mapping 1132, 1334 and loads group 1130 (R1H3, R2H3, R1H3", R2H3") in the volatile memory 124 of host node 122.

Assume a query joins these two tables 1100, 1103 based on the DATES column, and DATES column is the partition key for the range partitioning scheme (which is different from the partition key for the hash partitioning scheme). Because the tables were distributed by the hash partitioning scheme and not the range partitioning scheme, the parallel query coordinator 106 for this query creates work granules for requesting all in-memory rows for the two tables 1100, 1103 from the three database server instances 106, 116, 126, rather than leveraging the optimization of an in-parallel partition-wise join on two database server instances (one database server instance performing work against data from partitions meeting R1 partition criterion and one database server instance performing work against data from partitions meeting R2 partition criterion).

The work for evaluating the join condition may still be executed as a partition-wise join in the parallel query coordinator 106. Only rows from partitions with an R1 partition criterion are compared against each other, and only rows from partitions with an R2 partition criterion are compared against each other. However, the work is a two-step process of (1) receiving the necessary partitions from each node and then (2) evaluating the partition-wise join on a single node, rather than a three step process of (1) transferring the necessary partitions onto two nodes, (2) performing partition-wise join on the two nodes in parallel, and then (3) aggregating the results into a single node.

In-Parallel Partition Pruning

In-parallel partition pruning involves every database server instance only accessing in-memory data corresponding to partitions that could provide a TRUE evaluation. For example, assume a query selects all rows from table 1100 that have DATES in the second QUARTER of a year as presented in FIG. 11A. After reviewing the partition criteria of each partition in table 1100, the parallel query coordinator determines that data from partitions with R1 partition criterion cannot provide a TRUE evaluation, so the parallel query coordinator creates a query execution plan for only evaluating the condition against data from partitions with R2 partition criterion. The pruning optimization is naturally spread across each database server instance 106, 116, 126 when executed in-memory on the cluster as presented in FIG. 11C.

- Database server instance 106 only accesses chunks from partition R2H1 in local volatile memory 104 and does not perform work against rows from partition R1H1;
- Database server instance 116 only accesses chunks from partition R2H2 in local volatile memory 114 and does not perform work against rows from partition R1H2; and
- Database server instance 126 only accesses chunks from partition R2H3 in local volatile memory 124 and does not perform work against rows from partition R1H3.

Redundant Loading of Partitions

According to one embodiment, the same partition can be hosted at multiple nodes. Partitions redundantly loaded provide backup partitions in the event of a node failure and parallel query execution in the event two queries are required to execute against the same in-memory data. Because data from chunks may be distributed according to the partition group to which they belong, the query execution methods previously described work without additional steps added to the query execution process.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
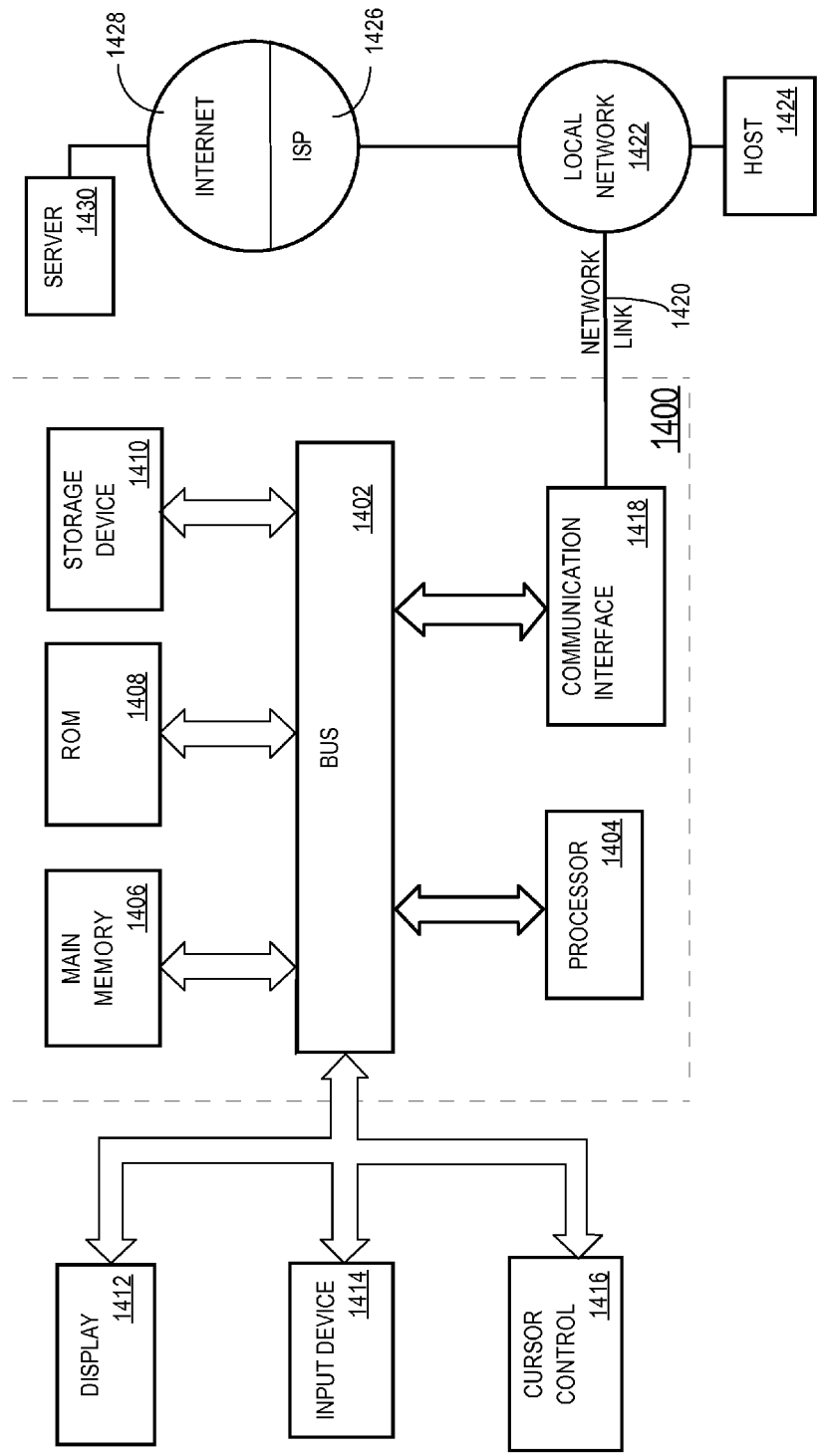
FIG. 14 is a block diagram illustrating a computer system that may be used to implement the techniques described herein.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   prior to receiving a join query that requires work to be performed on a first set of data that belongs to a first partitioned object that resides on-disk, performing the steps of:
   pre-loading into volatile memory data from the first partitioned object;
   wherein the first partitioned object includes a first plurality of partitions;
   wherein pre-loading the first partitioned object includes:
   mapping, to each partition group of a plurality of partition groups, a set of partitions from the first plurality of partitions;
   wherein each of the plurality of partition groups corresponds to corresponding partition criteria; and
   wherein, for each respective set of partitions mapped to a given partition group of the plurality of partition groups, each partition of the set of partitions satisfies the partition criteria corresponding to the given partition group;
   assigning each partition group of the plurality of partition groups to a corresponding host node of a plurality of host nodes;
   pre-loading each given partition of the first plurality of partitions into volatile memory of a host node that corresponds to the partition group to which the given partition is mapped;
   in response to receiving the join query, distributing work required by the join query to the plurality of host nodes based on which partition groups have been assigned to each of the plurality of host nodes.

2. The method of claim 1 further comprising, prior to receiving the join query, performing the steps of:
   pre-loading into volatile memory data from a second partitioned object;
   wherein the second partitioned object includes a second plurality of partitions;
   wherein pre-loading the second partitioned object includes:
   mapping the second plurality of partitions to the plurality of partition groups; and
   pre-loading each partition of the second plurality of partitions into volatile memory of the host node that corresponds to the partition group to which the given partition is mapped;
   wherein the join query requires a join between the first partitioned object and the second partitioned object.

3. The method of claim 2, wherein:
   the first partitioned object is composite partitioned according to a plurality of partitioning schemes;
   the second partitioned object is partitioned according to at least one partitioning scheme; and
   the method further comprises:
   determining a common partitioning scheme among:
   the plurality of partitioning schemes, and
   the at least one partitioning scheme; and
   establishing the plurality of partition groups based on the common partitioning scheme.

4. The method of claim 2, wherein:
   the method further comprises creating a partition-to-node mapping that reflects how the first plurality of partitions are mapped to the plurality of partition groups; and
   the step of mapping the second plurality of partitions to the plurality of partition groups comprises:

scanning a partition-to-node mapping; and
mapping the second plurality of partitions to the plurality of partition groups based on the partition-to-node mapping.

5. The method of claim 2, wherein:
the first partitioned object is composite partitioned according to a first plurality of partitioning schemes;
the second partitioned object is composite partitioned according to a second plurality of partitioning schemes;
the method further comprises:
  determining a plurality of common partitioning schemes among:
    the first plurality of partitioning schemes, and
    the second plurality of partitioning schemes; and
  identifying one or more hash partitioning schemes of the plurality of common partitioning schemes;
  after identifying the one or more hash partitioning schemes, identifying, from the one or more hash partitioning schemes, a highest cardinality partitioning scheme;
  establishing the plurality of partition groups based on the highest cardinality partitioning scheme.

6. The method of claim 2, wherein:
the first partitioned object is composite partitioned according to a first plurality of partitioning schemes;
the second partitioned object is composite partitioned according to a second plurality of partitioning schemes;
the method further comprises:
  determining a plurality of common partitioning schemes among:
    the first plurality of partitioning schemes, and
    the second plurality of partitioning schemes; and
  determining that none of the plurality of common partitioning schemes is a hash partitioning scheme;
  after determining that none of the plurality of common partitioning schemes is a hash partitioning scheme, identifying, from the plurality of common partitioning schemes, a highest cardinality partitioning scheme; and
  establishing the plurality of partition groups based on the highest cardinality partitioning scheme.

7. The method of claim 2, wherein:
the first partitioned object is partitioned based on a first column;
the step of mapping, to each partition group of the plurality of partition groups, a set of partitions from the first plurality of partitions is based on values in the first column;
the second partitioned object is partitioned based on a second column;
the step of mapping the second plurality of partitions to the plurality of partition groups is based on values in the second column;
the join query joins the first partitioned object with the second partitioned object based on the first column of the first partitioned object and the second column of the second partitioned object;
each host node performs a join between:
  one or more partitions of the first partitioned object that have been pre-loaded into volatile memory of the host node; and
  one or more partitions of the second partitioned object that have been pre-loaded into volatile memory of the host node.

8. The method of claim 2, further comprising:
the first partitioned object is partitioned based on a first column;
the step of mapping the first plurality of partitions to the plurality of partition groups is based on values in the first column;
the second partitioned object is partitioned based on a second column;
the step of mapping the second plurality of partitions to the plurality of partition groups is based on values in the second column;
the join query joins the first partitioned object with the second partitioned object based on columns other than the first column and the second column;
each host node sends to a single node:
  partitions of the first partitioned object that have been pre-loaded in volatile memory of the host node; and
  partitions of the second partitioned object that have been pre-loaded in volatile memory of the host node;
the single node performing work required by the join query, where performing work required by the join query includes performing a partition-wise join between the first partitioned object and the second partitioned object based on partitions received from the plurality of host nodes.

9. The method of claim 1, wherein:
the first partitioned object is composite partitioned according to a plurality of partitioning schemes; and
the method further comprises:
  identifying one or more hash partitioning schemes of the plurality of partitioning schemes;
  after identifying the one or more hash partitioning schemes, identifying, from the one or more hash partitioning schemes, a highest cardinality partitioning scheme; and
  establishing the plurality of partition groups based on the highest cardinality partitioning scheme.

10. The method of claim 1, wherein:
the first partitioned object is composite partitioned according to a plurality of partitioning schemes; and
the method further comprises:
  determining that none of the plurality of partitioning schemes is a hash partitioning scheme;
  after determining that none of the plurality of partitioning schemes is a hash partitioning scheme, identifying, from the plurality of partitioning schemes, a highest cardinality partitioning scheme; and
  establishing the plurality of partition groups based on the highest cardinality partitioning scheme.

11. The method of claim 1, wherein:
each partition group of the plurality of partition groups is assigned to two or more corresponding host nodes of the plurality of host nodes; and
pre-loading each given partition of the first plurality of partitions into volatile memory includes pre-loading each given partition of the first plurality of partitions into volatile memory of each of the plurality of host nodes that correspond to the partition group to which the given partition is mapped.

12. One or more non-transitory computer-readable media storing instructions which, when executed by one or more processors, cause:
prior to receiving a join query that requires work to be performed on a first set of data that belongs to a first partitioned object that resides on-disk, performing the steps of:
  pre-loading into volatile memory data from the first partitioned object;
  wherein the first partitioned object includes a first plurality of partitions;

wherein pre-loading the first partitioned object includes:
  mapping, to each partition group of a plurality of partition groups, a set of partitions from the first plurality of partitions;
  wherein each of the plurality of partition groups corresponds to corresponding partition criteria; and
  wherein, for each respective set of partitions mapped to a given partition group of the plurality of partition groups, each partition of the set of partitions satisfies the partition criteria corresponding to the given partition group;
  assigning each partition group of the plurality of partition groups to a corresponding host node of a plurality of host nodes;
  pre-loading each given partition of the first plurality of partitions into volatile memory of a host node that corresponds to the partition group to which the given partition is mapped;
in response to receiving the join query, distributing work required by the join query to the plurality of host nodes based on which partition groups have been assigned to each of the plurality of host nodes.

13. The one or more non-transitory computer-readable media of claim 12, wherein the instructions further comprises instructions which, when expected by one or more processors, cause, prior to receiving the join query:
pre-loading into volatile memory data from a second partitioned object;
wherein the second partitioned object includes a second plurality of partitions;
wherein pre-loading the second partitioned object includes:
  mapping the second plurality of partitions to the plurality of partition groups; and
  pre-loading each partition of the second plurality of partitions into volatile memory of the host node that corresponds to the partition group to which the given partition is mapped;
wherein the join query requires a join between the first partitioned object and the second partitioned object.

14. The one or more non-transitory computer-readable media of claim 13, wherein:
the first partitioned object is composite partitioned according to a plurality of partitioning schemes;
the second partitioned object is partitioned according to at least one partitioning scheme; and
the instructions further comprise instructions which, when executed by one or more processors, cause:
  determining a common partitioning scheme among:
    the plurality of partitioning schemes, and
    the at least one partitioning scheme; and
  establishing the plurality of partition groups based on the common partitioning scheme.

15. The one or more non-transitory computer-readable media of claim 13, wherein the instructions further comprise instructions which, when executed by one or more processors, cause:
creating a partition-to-node mapping that reflects how the first plurality of partitions are mapped to the plurality of partition groups; and
wherein the step of mapping the second plurality of partitions to the plurality of partition groups comprises:
  scanning a partition-to-node mapping; and
  mapping the second plurality of partitions to the plurality of partition groups based on the partition-to-node mapping.

16. The one or more non-transitory computer-readable media of claim 13, wherein:
the first partitioned object is composite partitioned according to a first plurality of partitioning schemes;
the second partitioned object is composite partitioned according to a second plurality of partitioning schemes;
the instructions further comprise instructions which, when executed by one or more processors, cause:
  determining a plurality of common partitioning schemes among:
    the first plurality of partitioning schemes, and
    the second plurality of partitioning schemes; and
  identifying one or more hash partitioning schemes of the plurality of common partitioning schemes;
  after identifying the one or more hash partitioning schemes, identifying, from the one or more hash partitioning schemes, a highest cardinality partitioning scheme;
  establishing the plurality of partition groups based on the highest cardinality partitioning scheme.

17. The one or more non-transitory computer-readable media of claim 13, wherein:
the first partitioned object is composite partitioned according to a first plurality of partitioning schemes;
the second partitioned object is composite partitioned according to a second plurality of partitioning schemes;
the instructions further comprise instructions which, when executed by one or more processors, cause:
  determining a plurality of common partitioning schemes among:
    the first plurality of partitioning schemes, and
    the second plurality of partitioning schemes; and
  determining that none of the plurality of common partitioning schemes is a hash partitioning scheme;
  after determining that none of the plurality of common partitioning schemes is a hash partitioning scheme, identifying, from the plurality of common partitioning schemes, a highest cardinality partitioning scheme; and
  establishing the plurality of partition groups based on the highest cardinality partitioning scheme.

18. The one or more non-transitory computer-readable media of claim 13, wherein:
the first partitioned object is partitioned based on a first column;
the step of mapping, to each partition group of the plurality of partition groups, a set of partitions from the first plurality of partitions is based on values in the first column;
the second partitioned object is partitioned based on a second column;
the step of mapping the second plurality of partitions to the plurality of partition groups is based on values in the second column;
the join query joins the first partitioned object with the second partitioned object based on the first column of the first partitioned object and the second column of the second partitioned object;
each host node performs a join between:
  one or more partitions of the first partitioned object that have been pre-loaded into volatile memory of the host node; and one or more partitions of the second partitioned object that have been pre-loaded into volatile memory of the host node.

19. The one or more non-transitory computer-readable media of claim 13, wherein the instructions further comprises instructions which, when executed by one or more processors, cause:
the first partitioned object is partitioned based on a first column;
the step of mapping the first plurality of partitions to the plurality of partition groups is based on values in the first column;
the second partitioned object is partitioned based on a second column;
the step of mapping the second plurality of partitions to the plurality of partition groups is based on values in the second column;
the join query joins the first partitioned object with the second partitioned object based on columns other than the first column and the second column;
each host node sends to a single node:
partitions of the first partitioned object that have been pre-loaded in volatile memory of the host node; and
partitions of the second partitioned object that have been pre-loaded in volatile memory of the host node;
the single node performing work required by the join query, where performing work required by the join query includes performing a partition-wise join between the first partitioned object and the second partitioned object based on partitions received from the plurality of host nodes.

20. The one or more non-transitory computer-readable media of claim 12, wherein:
the first partitioned object is composite partitioned according to a plurality of partitioning schemes; and
the instructions further comprise instructions which, when executed by one or more processors, cause:
identifying one or more hash partitioning schemes of the plurality of partitioning schemes;
after identifying the one or more hash partitioning schemes, identifying, from the one or more hash partitioning schemes, a highest cardinality partitioning scheme; and
establishing the plurality of partition groups based on the highest cardinality partitioning scheme.

21. The one or more non-transitory computer-readable media of claim 12, wherein:
the first partitioned object is composite partitioned according to a plurality of partitioning schemes; and
the instructions further comprise instructions which, when executed by one or more processors, cause:
determining that none of the plurality of partitioning schemes is a hash partitioning scheme;
after determining that none of the plurality of partitioning schemes is a hash partitioning scheme, identifying, from the plurality of partitioning schemes, a highest cardinality partitioning scheme; and
establishing the plurality of partition groups based on the highest cardinality partitioning scheme.

22. The one or more non-transitory computer-readable media of claim 12, wherein:
each partition group of the plurality of partition groups is assigned to two or more corresponding host nodes of the plurality of host nodes; and
pre-loading each given partition of the first plurality of partitions into volatile memory includes pre-loading each given partition of the first plurality of partitions into volatile memory of each of the plurality of host nodes that correspond to the partition group to which the given partition is mapped.

* * * * *

UNITED STATES PATENT AND TRADEMARK OFFICE
CERTIFICATE OF CORRECTION

PATENT NO. : 10,002,148 B2
APPLICATION NO. : 14/806411
DATED : June 19, 2018
INVENTOR(S) : Mukherjee et al.

Page 1 of 1

It is certified that error appears in the above-identified patent and that said Letters Patent is hereby corrected as shown below:

On the Title Page

In Column 1, item (63) under Related U.S. Application Data, Line 2, delete "9,875,259." and insert -- 9,875,259 and a Continuation-in-part of application No. 14/805,949, filed on Jul. 07, 2015. --, therefor.

In the Specification

In Column 8, Line 40, delete "copys." and insert -- copies. --, therefor.

In Column 8, Line 40, delete "copys." and insert -- copies. --, therefor.

In Column 8, Line 63, after "min_size" insert -- . --.

In Column 19, Line 54, after "data" insert -- . --.

In the Claims

In Column 35, Line 28, in Claim 13, delete "expected" and insert -- executed --, therefor.

Signed and Sealed this
Sixteenth Day of April, 2019

Andrei Iancu
*Director of the United States Patent and Trademark Office*